(12) United States Patent
Tateishi et al.

(10) Patent No.: US 6,498,958 B1
(45) Date of Patent: Dec. 24, 2002

(54) APPARATUS AND METHOD FOR CALCULATING AN AIR-CONDITIONING SYSTEM CONTROLLED VARIABLE

(75) Inventors: Masahiko Tateishi, Nagoya (JP); Katsuhiko Samukawa, Munich (JP); Takayoshi Kawai, Hoi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/494,142

(22) Filed: Jan. 28, 2000

(30) Foreign Application Priority Data

Feb. 5, 1999 (JP) .......................................... 11-028806

(51) Int. Cl.[7] .............................................. G05B 13/02
(52) U.S. Cl. ........................ 700/47; 700/299; 700/300; 700/28; 706/14
(58) Field of Search .............................. 700/28, 47, 44, 700/276–278, 299–300; 706/14

(56) References Cited

U.S. PATENT DOCUMENTS

| | | | | |
|---|---|---|---|---|
| 4,205,381 A | * | 5/1980 | Games et al. ................ | 700/277 |
| 4,811,257 A | * | 3/1989 | Sumitani et al. ............ | 708/131 |
| 4,873,649 A | * | 10/1989 | Grald et al. ................ | 700/276 |
| 4,897,798 A | * | 1/1990 | Cler ........................... | 700/276 |
| 5,715,165 A | * | 2/1998 | Luh et al. .................. | 700/173 |
| 5,748,508 A | * | 5/1998 | Baleanu ...................... | 703/13 |

FOREIGN PATENT DOCUMENTS

| | | | | |
|---|---|---|---|---|
| JP | 358068112 A | * | 4/1983 | ........ G05B/19/403 |
| JP | 5-149602 | | 6/1993 | ........... F24F/11/02 |
| JP | 7-172143 | | 7/1995 | ............ B60H/1/00 |
| JP | 9-105352 | | 4/1997 | ........... F02D/45/00 |
| JP | B2-2712947 | | 10/1997 | ............ F24F/11/02 |

OTHER PUBLICATIONS

Numerical Recipes In C (Japanese edition—English translation provided for portions of pp. 76, 79 and 80), William H. Press et al., 1988, Cambridge University Press.

* cited by examiner

Primary Examiner—Thomas Black
Assistant Examiner—Crystal J. Barnes
(74) Attorney, Agent, or Firm—Law Offices of David G. Posz

(57) ABSTRACT

A controlled variable-calculating apparatus and method that can easily calculate a controlled variable from one or more input variables and that can appropriately learn control characteristics for the calculation of the controlled variable. The control characteristics are represented as a surface embedded in an (n+1)-dimensional space, and are used to control one controlled variable from n variables. The control characteristics are approximated by an assemblage of flat planes corresponding to subspaces obtained by dividing an n-dimensional input space. For example, a two-dimensional input space defined by the interior temperature and the amount of sunlight is divided into 15 subspaces. Flat planes 1–15 are made to correspond to the subspaces, respectively. If the interior temperature and the amount of sunlight are entered, a decision is made as to which subspace the environmental conditions belong. The airflow is then calculated using an equation for any one of the flat planes 1–15. If the airflow is needs to be modified, the equation for the flat plane corresponding to the corresponding subspace is updated.

18 Claims, 26 Drawing Sheets

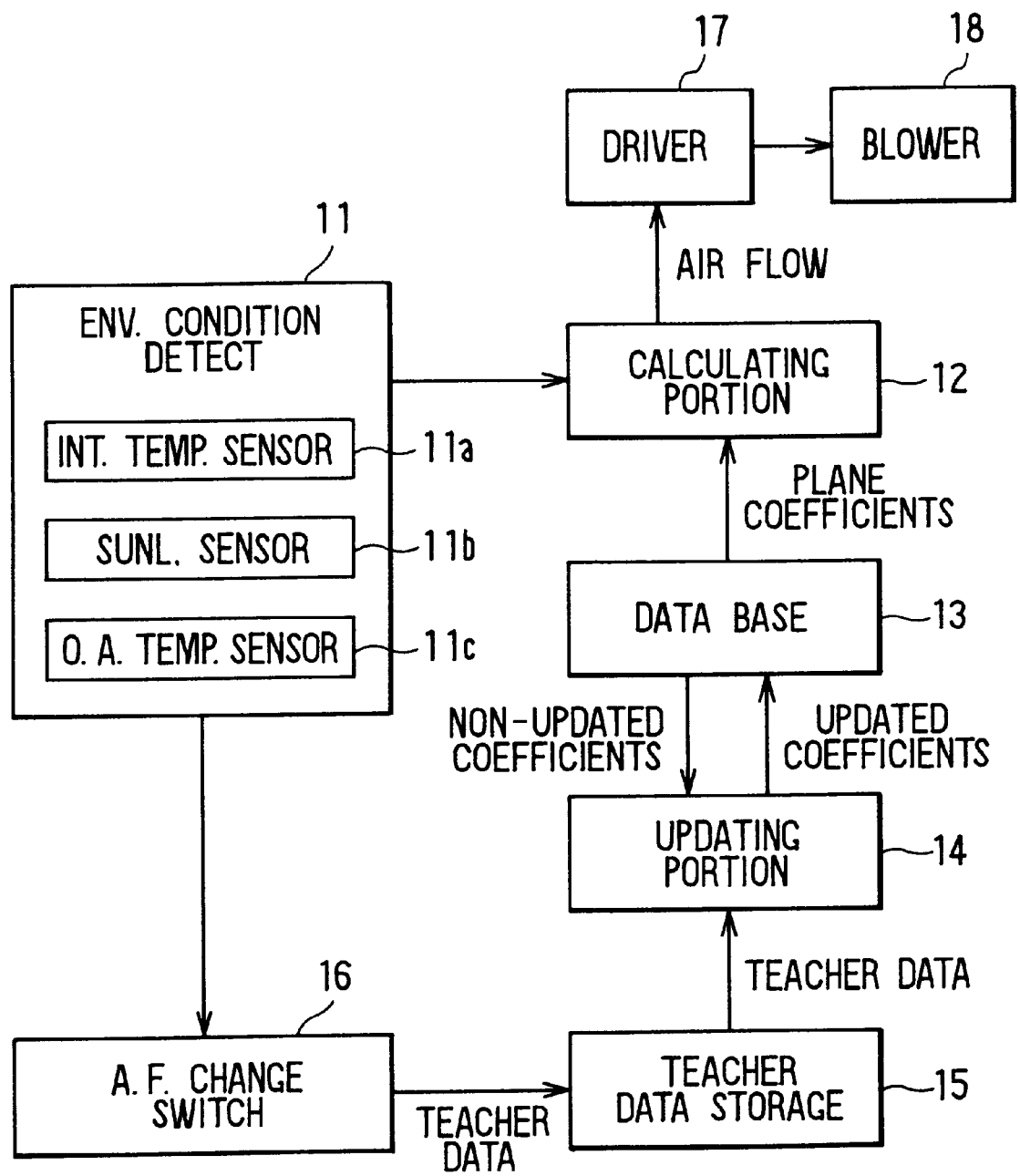

BEFORE CORRECTION

AFTER CORRECTION

OUTSIDE AIR TEMP. 20°C

OUTSIDE AIR TEMP. 30°C

OUTSIDE AIR TEMP. 35°C

BEFORE LEARNING

AFTER LEARNING

US 6,498,958 B1

APPARATUS AND METHOD FOR CALCULATING AN AIR-CONDITIONING SYSTEM CONTROLLED VARIABLE

CROSS-REFERENCE TO RELATED APPLICATION

The present invention is related to, and claims priority from, Japanese Patent Application No. Hei. 11-28806 filed on Feb. 5, 1999, the contents of which are incorporated herein by reference.

BACKGROUND OF THE INVENTION

1. Field of the Invention

The present invention relates to air-conditioning systems and, more particularly, to an apparatus for calculating a controlled variable, such as airflow (blower speed), based on n detected variables including outside (ambient) air temperature, interior (cabin) temperature, and amount of sunlight (sun load).

2. Description of the Related Art

A conventional automated climate control (ACC) system typically controls airflow, air temperature at the air distribution ductr exit, or other variables according to environmental conditions such as outside air temperature, interior temperature, and amount of sunlight. Control characteristics for calculating a controlled variable, such as airflow or the temperature at the air distribution duct exit (outlet temperature), from environmental conditions are typically adjusted for each vehicle and stored in a non-volatile system memory such as a ROM, and therefore are usually impossible to modify once they are stored.

Systems utilizing such control characteristics have certain limitations. For example, to control airflow in a system in which the control characteristics are unalterable, sensors that detect outside air temperature, interior temperature, and amount of sunlight generate signals representative of the measured amounts. The airflow is calculated based on these three input signals according to the aforementioned control characteristics, and operation of a blower is controlled to achieve the calculated airflow.

FIG. 15 is a cooling airflow control characteristic map showing one example of control characteristics used to calculate airflow. In this case, the outside air temperature and the amount of sunlight are regarded as constant. Only the interior temperature is varied.

As the interior temperature approaches the set temperature (25° C. in this example), the airflow is minimized. As the interior temperature rises above the set temperature, the airflow is increased. The flow rate is maximized around 50° C. Where plural input signals are used, a similar map is typically utilized in calculating the controlled variable based on the control characteristics.

In a conventional control procedure using a map based on plural input signals (assuming that there are two input signals; that is, airflow is calculated from both interior temperature and amount of sunlight), as shown in FIG. 16, airflow corresponds to a point (x, y) on a plane that is determined by the interior temperature (x) and the amount of sunlight (y). However, it is unrealistic to make the airflow correspond to every point (x, y) on the plane that is determined by the interior temperature (x) and the amount of sunlight (y), i.e., the entire input space.

Therefore, as shown in FIG. 16, the input space is divided into subspaces orcells. Each airflow value corresponds to the intersections of lines indicating boundaries between the cells. Airflow corresponding to a point inside a cell is found by bilinear interpolation.

In the example shown in FIG. 16, if two input signals indicating the interior temperature (x) and the amount of sunlight (y), respectively, are entered, a decision is made to determine to what cell a point A(x, y) on a plane determined by the interior temperature (x) and the amount of sunlight (y) belongs. Bilinear interpolation is performed, based on four vertices $(x_0, y_0)$, $(x_1, y_0)$, $(x_0, y_1)$, and $(x_1, y_1)$ defining the cell and on the stored airflow value corresponding to the four vertices.

If $blw_{00}$, $blw_{10}$, $blw_{01}$, and $blw_{11}$ represent airflows corresponding to the four vertices $(x_0, y_0)$, $(x_1, y_0)$, $(x_0, y_1)$, and $(x_1, y_1)$, respectively, the algorithm of this bilinear interpolation is as follows. First, X and Y are calculated using Eqs.(1) and (2).

$$X = \frac{x - x_0}{x_1 - x_0} \quad (1)$$

$$Y = \frac{y - y_0}{y_1 - y_0} \quad (2)$$

An airflow blw corresponding to the point A(x, y) is calculated using Eq. (3).

$$blw = (1-X)(1-Y) \times blw_{00} + X(1-Y)blw_{10} + (X-1)Y \times blw_{01} + XY \times blw_{11} \quad (3)$$

It should be noted that, although the above description is based on two input signals, calculations can be performed by a similar procedure if there are three or more input signals.

Generally, preset control characteristics based on the above conventional technique are embodied as relations of the vertices of a subspace in an input space to airflows at the vertices. Since bilinear interpolation is used for calculation of a controlled variable based on the preset control characteristics, the amount of required calculations increases with increasing the number of input signals.

In the above conventional air conditioning system, if a system user is dissatisfied with the automatically controlled airflow, the user must typically manually adjust the airflow through a switch or the like. This manual control can enable the system to store. teacher data that can be utilized to update the preset control characteristics favored by the user.

Use of such teacher data will now be explained based on the following example. Preferred airflows of three panelists (users) N, T, and Y during cooling are illustrated in FIGS. 17A–17C, which show the relation of the interior temperature to preferred airflows of users N, T, and Y where the amount of sunlight is kept at 500 W/m². FIG. 17A shows the case in which the outside air temperature is 20° C. FIG. 17B shows the case in which the outside air temperature is 30° C. FIG. 17C shows the case in which the outside air temperature is 35° C.

FIG. 18 simplifies the results shown in FIG. 17B. As can be seen, the preferred airflows of panelists (or users) N, T, and Y relative to various interior temperatures appear as a gradient of a cooling airflow control characteristic line from the maximum airflow to the minimum airflow shown in the map of FIG. 15. To realize control favored by each user by the learning of the control characteristics, it is necessary to vary the gradient of the control characteristic map lines. For example, where the airflow is controlled based on the map illustrating the preset control characteristics between the interior temperature and airflow as shown in FIGS. 19A and 19B, if the user reduces the airflow at interior temperature T1 and increases the airflow at interior temperature T2, as shown in FIG. 19A, the map is modified to the form shown in FIG. 19B. That is, a gradient is given to the characteristic line such that it passes through the modified airflows at the interior temperatures T1 and T2 at which the modifications were made.

Japanese Patent Application Laid-Open No. 5-149602 discloses a learning technique for household air-conditioning system control characteristics. This technique modifies the control characteristics only the vicinity of teacher data by adding the difference between the present control and the teacher data, as illustrated in FIG. 20. Therefore, it is impossible to realize control of the airflow in a favorable manner for the user under all environmental conditions.

Japanese Patent Application Laid-Open No. 7-172143 discloses a technique for learning an airflow upper limit at the start of operation of an ACC based on outside air temperature and amount of sunlight. In this disclosed technique, outside air temperature is accepted as an input signal. The graphed mapped control characteristics are used to calculate the airflow upper limit, and are modified according to the single input signal. Although the gradient of the graphed control characteristics are modified, the map is associated with only one input signal. Therefore, with respect to the amount of sunlight, either one of two kinds of maps is used, depending on whether the amount of sunlight is greater or smaller than a threshold.

The above situation is illustrated in FIGS. 21A and 21B. FIG. 21A illustrates a map prior to a learning process. FIG. 21B illustrates a map after the learning process. A map consisting of graphed lines indicating control characteristics used to calculate a controlled variable (airflow upper limit) from the outside air temperature is used. Although the gradient of the control characteristic line can be changed, only two control characteristic lines are used, depending on whether the amount of sunlight is large or small.

Accordingly, it is impossible to provide continuous control in response to the amount of sunlight. Hence, fine control cannot be provided in response to the amount of sunlight. Where the number of input signals is increased, if this method is still used, the number of control characteristic lines to be stored in memory correspondingly increases. For example, where two control characteristics are used, such as radiator water temperature and amount of sunlight, a control characteristic line is necessary under conditions where the amount sunlight is large and the radiator water temperature is high, while another control characteristic line is necessary under conditions where the amount of sunlight is large and the radiator water temperature is low. Also, a control characteristic line is necessary under conditions where the amount of sunlight is small and the radiator water temperature is high, while another control characteristic line is necessary under conditions where the amount of sunlight is small and the radiator water temperature is low. Thus, four control characteristic lines are needed.

As shown in FIG. 2A, control characteristics for calculating one controlled variable from two input signals are generally represented as a surface that is a two-dimensional figure embedded in a three-dimensional space. Ideally, the position and curvature at each portion on the surface are updated according to teacher data. However, updating such an arbitrary surface is difficult from a technical standpoint.

SUMMARY OF THE INVENTION

In view of the above limitations, it is an object of the present invention to provide an apparatus for controlling a controlled variable based on one or more input variables. It is also an object of the invention to provide a controlled variable-calculating apparatus that can learn control characteristics for calculating a controlled variable.

Specifically, the present invention provides a variable-calculating apparatus that calculates a controlled variable in response to n input variables, where n is a natural number. The variable-calculating apparatus is equipped with a storage device for storing equations for flat planes that make it possible to calculate an output number from n input variables.

The stored equations are defined corresponding to subspaces obtained by dividing an n-dimensional input space having an assemblage of points within an n-dimensional space corresponding to n input variables. The n input variables can be expressed as a point within the n-dimensional input space. Therefore, an assemblage of points corresponding to the n variables forms a region within then-dimensional space according to the range of values that each variable can assume. This region is herein referred to as the n-dimensional input space. For example, where n is 3, the region takes the form of a parallelepiped. If n is 2, it is a region in the form of a rectangle.

The aforementioned equations for flat planes are defined corresponding to these subspaces, respectively. If n input variables are entered, the controlled variable-calculating apparatus. selects an equation for a flat plane stored corresponding to a subspace to which the input variables belong. Using the selected equation, one controlled variable is calculated.

In order to calculate the controlled variable from n input variables, it is necessary to map an n-dimensional input space onto a one-dimensional space. For example, as shown in FIG. 2A, mapping from a two-dimensional input space onto a one-dimensional space can be defined using a surface that is a smooth two-dimensional figure embedded in a three-dimensional space, as shown in FIG. 2A. In FIG. 2A, if the amount of sunlight and the interior temperature are determined, i.e., if a point within a flat plane defined by two values (i.e., the amount of sunlight and the interior temperature) taken on two axes is set, the airflow is computed by finding the point intersecting the surface. By extending this theory, mapping from the n-dimensional space onto the one-dimensional space can be defined using the surface embedded in the (n+1)-dimensional space.

The surface has the same nature as a flat plane when viewed closely to each point ("*Modern Small Mathematical Encyclopedia*", p. 356, 1977, Kodan-sha Bluebacks Publishing Company, Japan). This nature also holds irrespective of the dimensional space in which the surface is embedded. Accordingly, an arbitrary surface can be approximated by combining sufficiently small flat planes by making use of the relation described above. Therefore, the control characteristics represented by the surface as described above can be approximated by combining sufficiently small flat planes.

In view of this fact, the present invention utilizes an n-dimensional input space divided into subspaces, with equations for flat planes being formulated to correspond to the subspaces, respectively. The input space may also be divided into cells, and the planes made to correspond to the cells, respectively. Because it is necessary to divide the whole space into numerous cells for approximation accuracy purposes, the possibility that the number of planes is increased wastefully is high. Accordingly, in the present invention, subspaces corresponding to the input variables are specified. The controlled variable is calculated using equations for flat planes corresponding to these subspaces.

In the controlled variable-calculating apparatus of the present invention, equations for flat planes corresponding to subspaces for n input variables are selected. Using the selected equation for flat planes, the controlled variable is calculated. Generally, an equation for a flat plane is given by $$f(x)=ax+by+ \ldots +cz+d$$

Such an equation can be quickly calculated from the n input variables x, y, . . . , z. Consequently, the controlled variable can be easily calculated.

In addition, the apparatus of the present invention includes a controlled variable modifier for modifying the controlled variable from the outside, as well as a learning control device. When the controlled variable is modified via the controlled variable modifier, the learning control device stores the modified controlled variable and input variables entered on this modification as teacher data in a teacher data storage device. The data is stored as teacher data corresponding to subject subspaces corresponding to the input variables. The learning control device updates the equation for a flat plane corresponding to the subject subspace based on the teacher data corresponding to the corresponding subspaces, with the teacher data being included in the teacher data stored in the teacher data storage device.

Other objects and features of the invention will appear in the course of the description thereof, which follows.

BRIEF DESCRIPTION OF THE DRAWINGS

FIG. 1 is a schematic block diagram of an automotive air-conditioning system in accordance with one embodiment of the present invention;

DESCRIPTION OF THE PREFERRED EMBODIMENTS

Figure 2A:
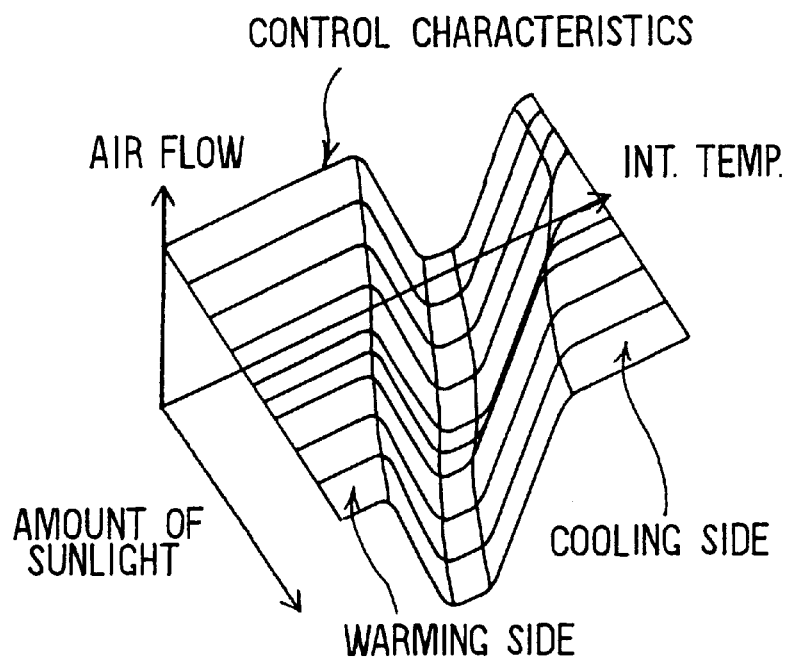
FIGS. 2A and 2B are diagrams illustrating a surface and a collection of flat planes representing airflow control characteristics, respectively.

The present invention will now be described with reference to the accompanying drawings. FIG. 1 is a block diagram schematically showing the structure of a vehicle air-conditioning system in accordance with one embodiment of the invention. This air-conditioning system includes an environment condition-detecting block 11, an airflow-calculating portion 12, a plane coefficient database 13, an airflow control characteristics-updating portion 14, a teacher data storage portion 15, an airflow change switch 16, a driver portion 17, and a blower 18.

The environment condition-detecting block 11 has an interior temperature sensor 11a for detecting the temperature of the air inside the passenger compartment of a vehicle, a sunlight amount sensor 11b for detecting the amount of sunlight, and an outside air temperature sensor 11c for detecting the temperature of the outside air. Sensor-generated signals representing these sensed parameters are sent as environmental conditions to the airflow-calculating portion 12 and to the airflow change switch 16.

The airflow-calculating portion 12 calculates the airflow based on the airflow control characteristics from the environmental conditions repeatedly produced from the environmental condition-detecting block 11. These airflow control characteristics are represented in terms of plural equations for flat planes. Plane coefficients that determine the equations are stored in the plane coefficient database 13.

The driver portion 17 drives and controls the blower 18 according to the airflow commanded by the airflow-calculating portion 12. That is, the airflow sent into the passenger compartment from the blower 18 is adjusted to be equal to the airflow commanded by the airflow-calculating portion 12.

The airflow change switch 16 permits a user to instruct the automatically adjusted airflow to be corrected. If the airflow is modified via the airflow change switch 16, the modified airflow and environmental conditions entered from the environmental condition-detecting block 11 are sent as teacher data to the teacher data storage portion 15.

The teacher data storage portion 15 stores the teacher data sent from the air flow change switch 16 and sends corresponding teacher data to the airflow control characteristics-updating portion 14.

When the teacher data is applied from the teacher data storage portion 15, the airflow control characteristics-updating portion 14 reads corresponding plane coefficients from the plane coefficient database 13, updates the plane coefficients according to the teacher data from the teacher data storage portion 15, and sends the updated plane coefficients again to the plane coefficient database 13.

More specifically, assuming there are n input variables x, y, ..., z, and w is a controlled variable, an equation for a flat plane is given by $$w = ax + by + \ldots cz + d$$

The plane coefficient database 13 stores the plane coefficients a, b, ..., c, d of the plane equation. The updating portion 14 updates the plane coefficients a, b, ..., c, d to update the equation for the flat plane. That is, the equation for a flat plane is generally determined only by the plane coefficients.

In this configuration, the teacher data consisting of the aforementioned controlled variable and input variables can be represented in terms of (x, y, ..., z, w). Therefore, teacher data about some subspace can be given by $(x_i, y_i, \ldots, z_i, w_i)$ (i=0, 1, 2, ..., k) at some instant of time. Note that i is assigned in the order in which teacher data items are stored. It is desired to find the plane coefficients of the equation for a flat plane which passes through these teacher data items $(x_i, y_i, \ldots, z_i, w_i)$ with maximum accuracy.

Accordingly, it is conceivable that the updating portion finds the plane coefficients $a_k, b_k, \ldots, x_k, d_k$ as solutions of simultaneous equations given by Eq. (4) below, based on the teacher data $(x_i, y_i, \ldots, z_i, w_i)$ (i=0, 1, 2, ..., k) corresponding to the subject subspaces.

$$\begin{pmatrix} x_1 & y_1 & \ldots & z_1 & 1 \\ x_2 & y_2 & \ldots & z_2 & 1 \\ \vdots & \vdots & & \vdots & \vdots \\ x_k & y_k & \ldots & z_k & 1 \end{pmatrix} \begin{pmatrix} a_k \\ b_k \\ \vdots \\ c_k \\ d_k \end{pmatrix} = \begin{pmatrix} w_1 \\ w_2 \\ \vdots \\ w_k \end{pmatrix} \quad (4)$$

For simplicity, Eq. (4) is denoted by Xa=w, where X represents the matrix at the lift side, a and w represent row vectors at the left and right side, respectively.

By determining the plane coefficients as solutions of these simultaneous equations, an equation for a flat plane exactly passing through the teacher data can be found.

Notice that K teacher data items corresponding to the subject subspace do not always lie on the same plane. In this case, the simultaneous equations given by Eq. (4) have no solutions. Accordingly, it is conceivable that plane coefficients $a_k, b_k, \ldots, c_k, d_k$ are found as least squares solutions of the simultaneous equations given by Eq. (4). Where the relation xa=w is established for the simultaneous equations given by Eq. (4), a solution a that minimizes |xa-w| is found. In this way, the equation for a flat plane passing through the teacher data with maximum accuracy can be found.

The matrix at the left side of Eq. (4) is not always a square matrix. Sometimes, it may be singular, which means that the number of equations, which are created from a determinant and are linearly independent of each other, is less than (n+1) unknowns. That is, the rank of the matrix is less than (n+1). In this case, it is impossible to uniquely determine the equation for a flat. plane from the given teacher data.

Accordingly, where the rank of the matrix given by Eq. (4) above is less than (n+1), if the subject subspace exists within a range given by $x_L \leq x \leq x_U$, $y_L \leq y \leq y_U$, ..., $z_L \leq z \leq z_U$, and if the plane coefficients of the equation for a flat plane corresponding to the subject subspace are $a_{k-1}$, $b_{k-1}, \ldots c_{k-1}, d_{k-1}$, then it is conceivable that the updating portion 14 will find the new plane coefficients $a_k, b_k, \ldots, c_k, d_k$ of the solution of Eq. (4) or the least squares solution that minimizes Eq. (5) below.

$$\int_{z_L}^{z_U} \cdots \int_{y_L}^{y_U} \int_{x_L}^{x_U} \{(a_k - a_{k-1})x + (b_k - b_{k-1})y + \ldots + (c_k - c_{k-1})z + (d_k - d_{k-1})\}^2 dx dy \ldots dz \quad (5)$$

An index that is the sum of squares of the amount of modification given by Eq. (5) above is defined here. The plane coefficients are determined under minimizing conditions in the manner described below.

Where the equations for flat planes are updated according to teacher data, i.e., where new plane coefficients are determined, it is ideal not to minimize the modification added to the original plane equations, because the original equations reflect the teacher data obtained thus far and reflect user's particular preferences. Therefore, the sum of the amounts of modifications added to the planes not yet modified, i.e., the amounts of discontinuity from the modified planes, is reduced to a minimum. That is, the value of Eq. (5) is minimized.

This makes it possible to uniquely solve the simultaneous equations given by Eq. (4). The flat planes found by this method greatly modify the vicinities of the newest teacher data $(x_k, y_k, \ldots, z_k, w_k)$ and appropriately reflect the amount of modification added to the controlled variable. Since the modification added to the original planes are minimized, effective use is made of the results of a learning process conducted thus far.

Using a procedure known as singular value decomposition (SVD) is an effective method of solving the simultaneous equations given in Eq. (4). Singular value decomposition is a very powerful tool for treating singular or similar matrices and equations, and it is known that this is the best method for solving linear least squares problems (NUMERICAL RECIPES in C, P.P 73–81, Gijutsu-Hyoron (Technical Review) Publishing Company, Japan). Especially, this is effective where the matrix at the left hand of Eq. (4) is singular. Where solutions that minimize the value of Eq. (5) should be found, calculations are performed, using the techniques of singular value decomposition and variable conversion. This can reduce the amount of calculation.

A flat plane given by the equation calculated as a least squares solution of Eq. (4) passes through given teacher data with maximum accuracy. However, it is not assured that it passes through the newest teacher data $(x_k, y_k, \ldots, z_k, w_k)$, which indicates the last corrected, controlled variable $w_k$ for control. To maintain the correction of the controlled variable $w_k$, it is necessary that the, updated equation for a plane pass through the teacher data $(x_k, y_k, \ldots, z_k, w_k)$.

Accordingly, it is conceivable that the updating portion 14 is constructed to update the equation for a plane so as to pass through the newest teacher data among the teacher data stored in memory and corresponding to the subject subspace. This makes. the correction of the newest controlled variable effective.

The air-conditioning system in accordance with the present embodiment operates primarily in two modes: airflow calculation mode and learning mode. The environmental condition-detecting block 11, the airflow-calculating portion 12, the plane coefficient database 13, the driver portion 17, and the blower 18 operate in the airflow calculation mode. In this mode, the airflow-calculating portion 12 reads corresponding, plane coefficients from the plane coefficient database 13, based on the environmental conditions detected by the environmental condition-detecting block 11, and repeatedly calculates the airflow using the equations for planes, the equations being determined by the read plane coefficients. The driver portion 17 drives and controls the blower 18 to achieve the calculated airflow.

The vehicular air-conditioning system normally operates in this airflow-calculating mode. However, if a manual operation is performed via the airflow change switch 16 to modify the airflow, the mode of operation is switched to the learning mode.

The environmental condition-detecting block 11, the airflow change switch 16, the teacher data storage portion 15, the airflow control characteristics-updating portion 14, and the plane coefficient database 13 are all operative during the learning mode. In the learning mode, the teacher data storage portion 15 stores teacher data delivered from the airflow change switch 16 and sends corresponding teacher data including the teacher data from the airflow change switch 16 to the airflow control characteristics-updating portion 14. The updating portion 14 updates the plane coefficients stored in the database 13 according to the teacher data read from the teacher data storage portion 15. Then, the mode of operation returns to the airflow calculation mode.

Operation of the present invention will now be described. In the present invention, the controlled variable airflow that is calculated from input signals indicating interior temperature, amount of sunlight, and outside air temperature detected by the environment condition-detecting block 11. Accordingly, mapping from a three-dimensional input space on to a one-dimensional space is defined. However, for purposes of explanation and ease of illustration, it will be assumed that the outside air temperature is kept constant at 10° C. and that the airflow is calculated from two input signals indicating the interior temperature and the amount of sunlight, respectively. In this case, mapping can be defined using a surface that is a smooth embedded in a three-dimensional space, as shown in FIG. 2A. Once the amount of sunlight and interior temperature are determined, airflow is calculated by finding the intersection with the surface.

By extending this theory, the surface embedded in a four-dimensional space is used in calculating the airflow from three input signals indicating interior temperature, amount of sunlight, and outside air temperature, respectively. In this case, the surface gives the airflow control characteristics for calculating the airflow. More generally, where one controlled variable is calculated from n input variables, a surface embedded in an (n+1)-dimensional space should be used. For simplicity, airflow control characteristics given as a plane model in FIG. 2B are taken as an example for calculating the airflow from two input signals indicating the interior temperature and the amount of sunlight, respectively.

As mentioned above, a surface has the same mathematical nature as a flat plane when viewed on a point-to-point basis. This nature also holds, irrespective of the dimensional space in which the surface is embedded. Therefore, an arbitrary surface can be approximated by combining sufficiently small planes. This means that the control characteristics represented by the surface as described above can be approximated by combining sufficiently small flat planes. For instance, airflow control characteristics represented by a surface embedded in a three-dimensional space as shown in FIG. 2A can be approximated by a combination of 15 flat planes 1–15 as shown in FIG. 2B.

Accordingly, in the present embodiment, a three-dimensional input space defined by interior temperature, amount of sunlight, and outside air temperature is divided into N subspaces. Equations for flat planes are made to correspond to these subspaces, respectively. Surfaces indicating the airflow control characteristics embedded in a four-dimensional space are approximated by models of flat planes. The models are projected onto a three-dimensional input space. In this case, regions corresponding to the flat planes are the above-described subspaces.

Figure 2B:
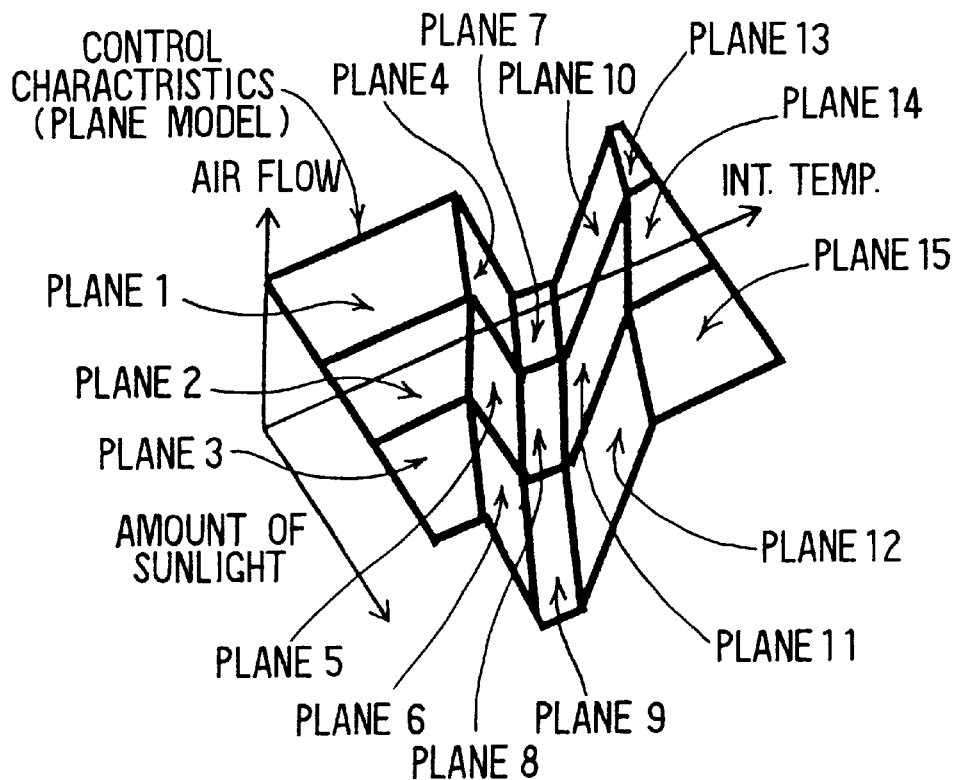

In the example of FIG. 2B, where models of flat planes indicating airflow characteristics are projected onto a flat plane defined by two axes, amount of sunlight (x) and interior temperature (y), regions onto which the planes 1–15 are projected are taken as subspaces. Projection of the plane models shown in FIG. 2B results in the diagram of FIG. 3A. Subspaces 1–15 shown in FIG. 3A correspond to flat planes 1–15 of the plane models shown in FIG. 2B.

Figure 3A:
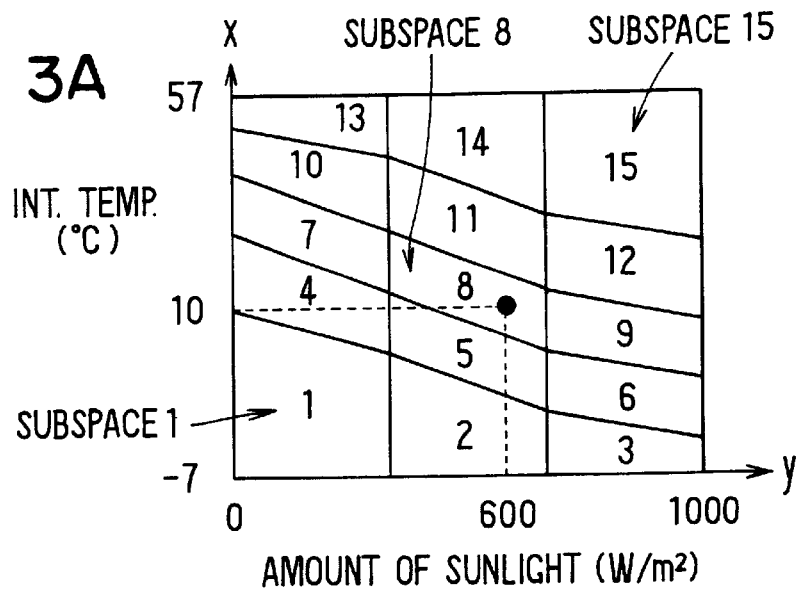
FIGS. 3A and 3B are diagrams illustrating subspaces that are made to correspond to flat planes of a plane model.

By correlating the subspaces with flat planes in this way, a point (x, y) corresponding to two input variables belongs to subspace 8 in FIG. 3A, where the interior temperature (x) is 10° C. and the amount of sunlight is 600 W/m². Therefore, the controlled variable can be calculated using the flat plane 8 corresponding to the subspace 8.

Figure 3B:
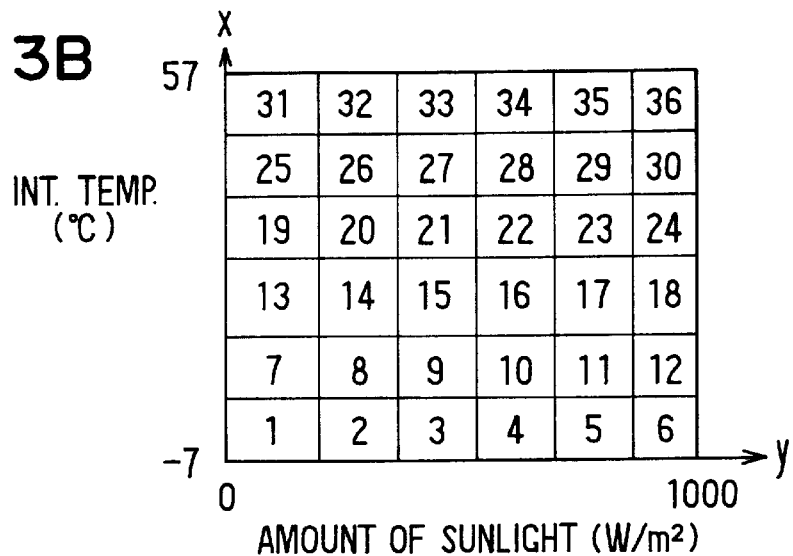

The input space may also be divided into cells as shown in FIG. 3B, and plane models serving as airflow control characteristics may be formed such that the flat planes are made to correspond to the cells, or subspaces 1–36, respectively. The present invention provides an advantage over other conventional systems in that the division is done easily.

To obtain necessary approximation accuracy, it is necessary to finely divide a part of the input space. However, as a result, the possibility that the number of flat planes is increased is high. Accordingly, it is desired to approximate a surface representing the control characteristics by flat plane models and to divide the input space in conformity to the flat plane models.

As described above, in the present embodiment, a surface representing airflow control characteristics is approximated by models of flat planes. Equations for flat planes are made to correspond to their respective subspaces obtained by dividing the input space. Consequently, a decision is made as to which subspace environmental conditions belong, and the controlled variable is calculated using equations for flat planes corresponding to the subspace.

In particular, in the airflow calculation mode described above, the airflow calculation portion 12 in accordance with the present embodiment makes a decision as to what subspace of N subspaces does a point (x, y, z) within a three-dimensional space belong to, the point being determined from interior temperature (x), amount of sunlight (y), and outside air temperature (z) from the environmental condition-detecting block 11. The subspace to which the point (x, y, z) belongs is referred to as the subspace j, where j is a superscript. Using an equation $f^j(x, y, z)$ ($=a^j x + b^j y + c^j z + d^j$) about the flat plane corresponding to the subspace j, the airflow blw is calculated as follows.

$$blw = a^j x + b^j y + c^j z + d^j \quad (6)$$

Figure 4:
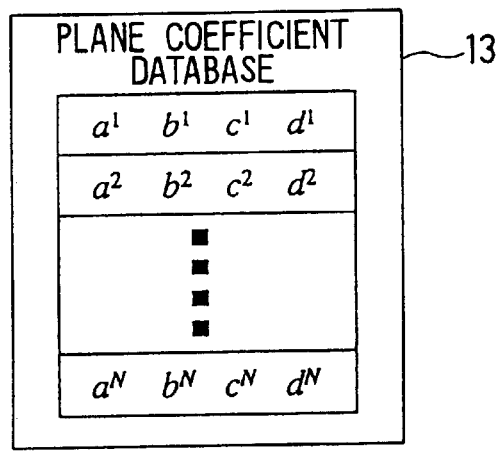
FIG. 4 is a diagram illustrating a plane coefficient database.

Equations for flat planes corresponding to the subspaces, respectively, are stored in the flat plane coefficient database 13 in the form of flat plane coefficients determining the equations. This is shown in FIG. 4, which illustrates the manner in which N flat plane coefficients $(a^1, b^1, c^1, d^1)$, $(a^2, b^2, c^2, d^2)$, ..., $(a^N, b^N, c^N, d^N)$ are stored, corresponding to the N subspaces, respectively. These plane coefficients are updated in the learning mode as described later. The initial values of the plane coefficients are calculated by approximating the factory settings of the airflow control characteristics by a least squares method in their respective subspaces.

Figure 16:
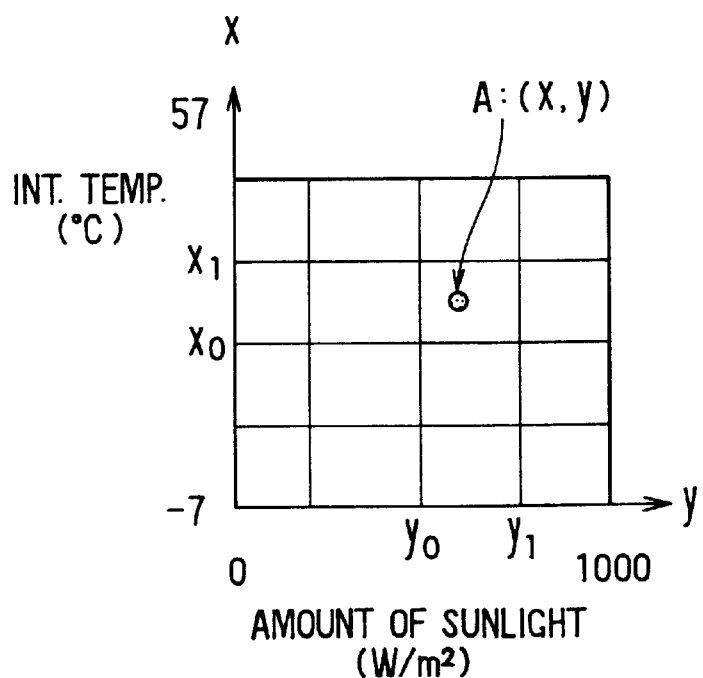
FIG. 16 is a diagram illustrating a technique for calculating airflow, based on conventional airflow control characteristics.
Figure 17A:
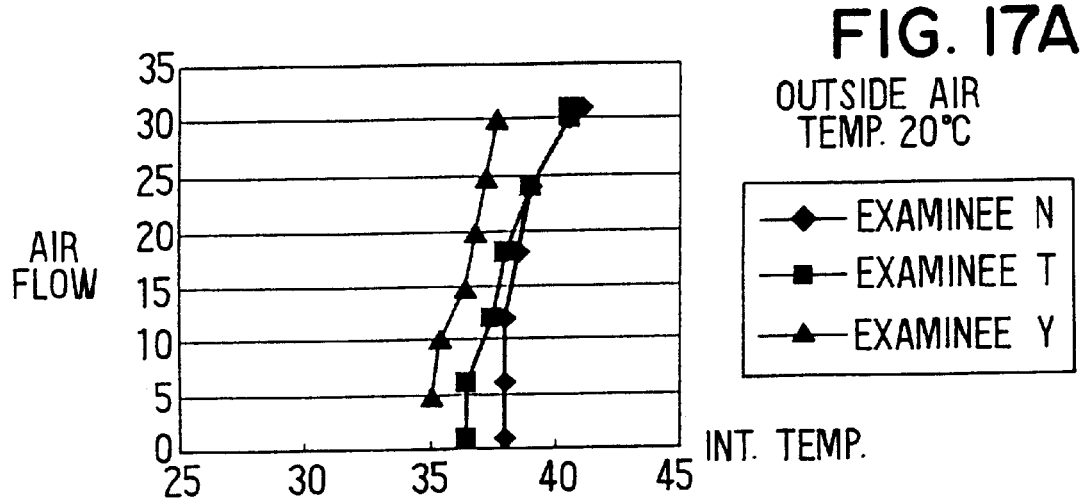
FIGS. 17A–17C are diagrams illustrating the results of examinations of airflow control characteristics preferred by three panelists (users)
Figure 17B:
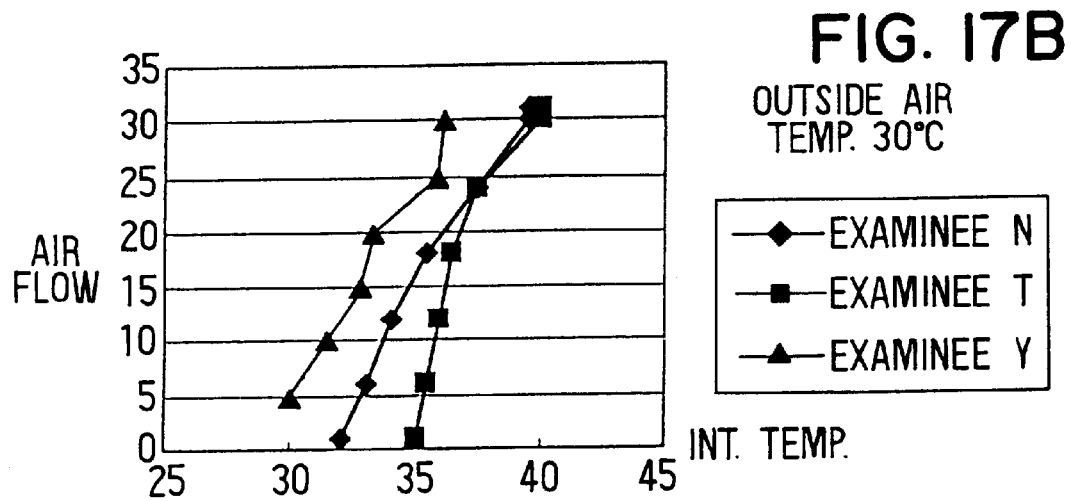
Figure 17C:
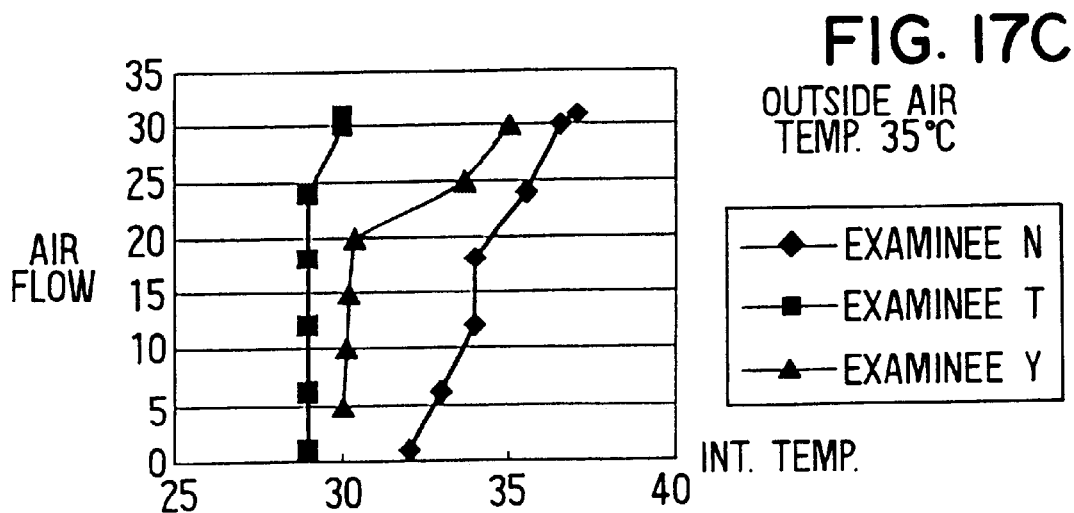
Figure 18:
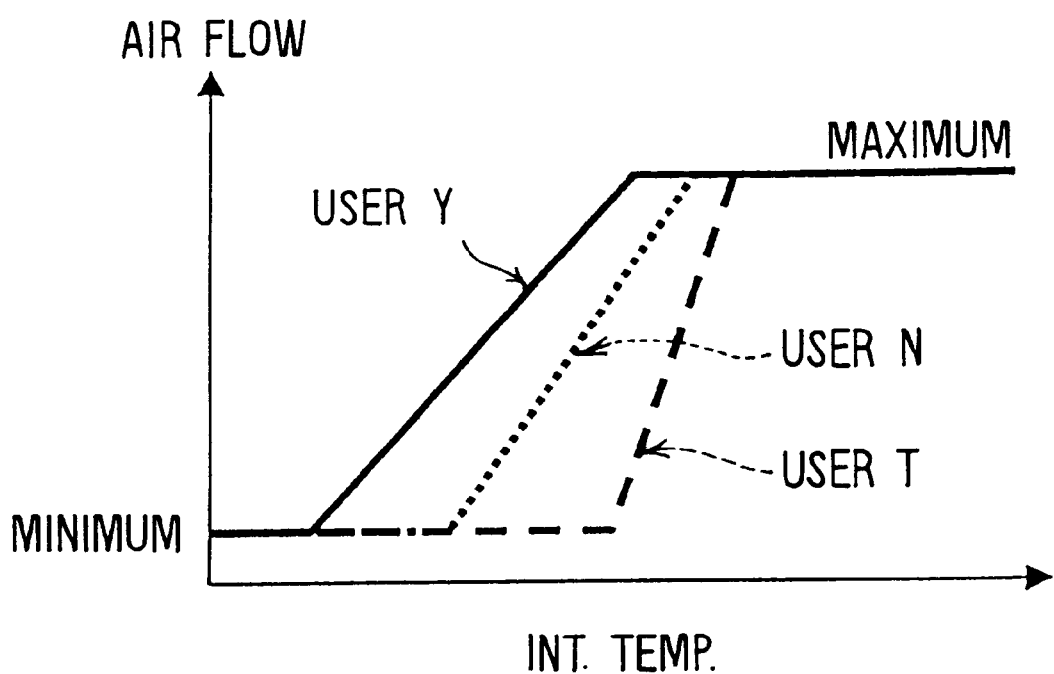
FIG. 18 is a diagram illustrating a map of airflow control characteristics preferred by the panelists.
Figure 19A:
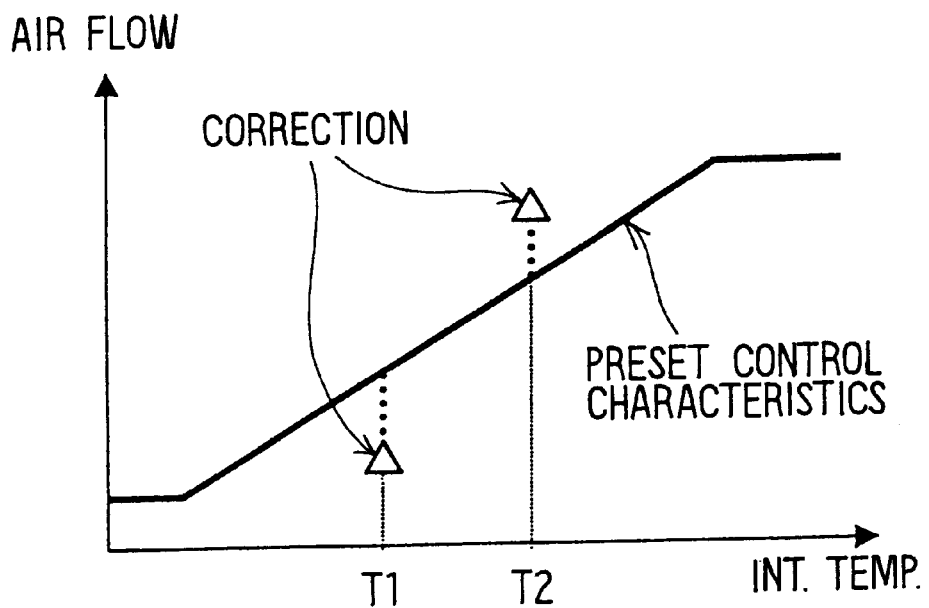
FIGS. 19A and 19B are diagrams illustrating an effective method of learning a map consisting of airflow control characteristics.
Figure 19B:
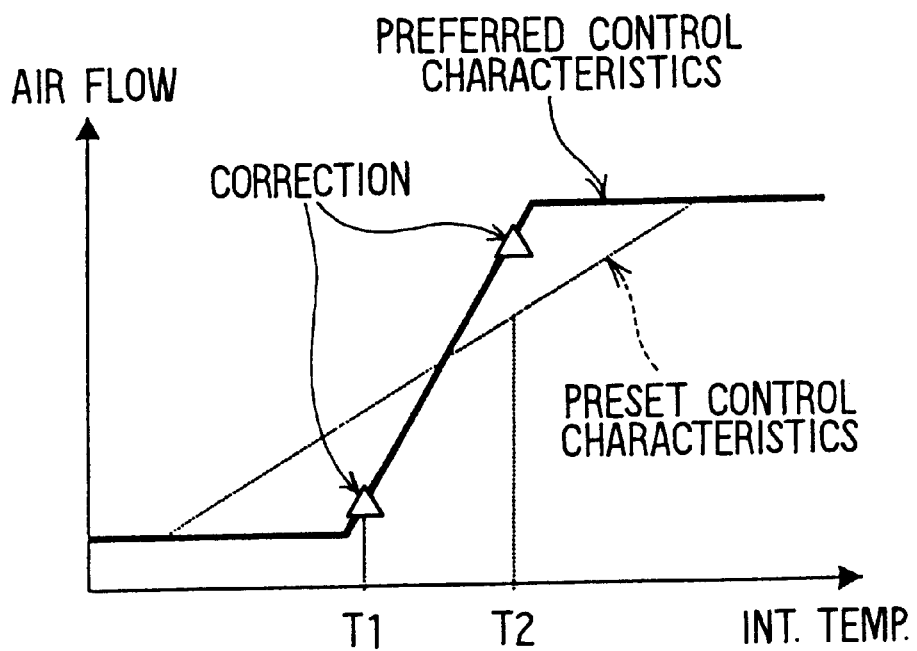
Figure 20A:
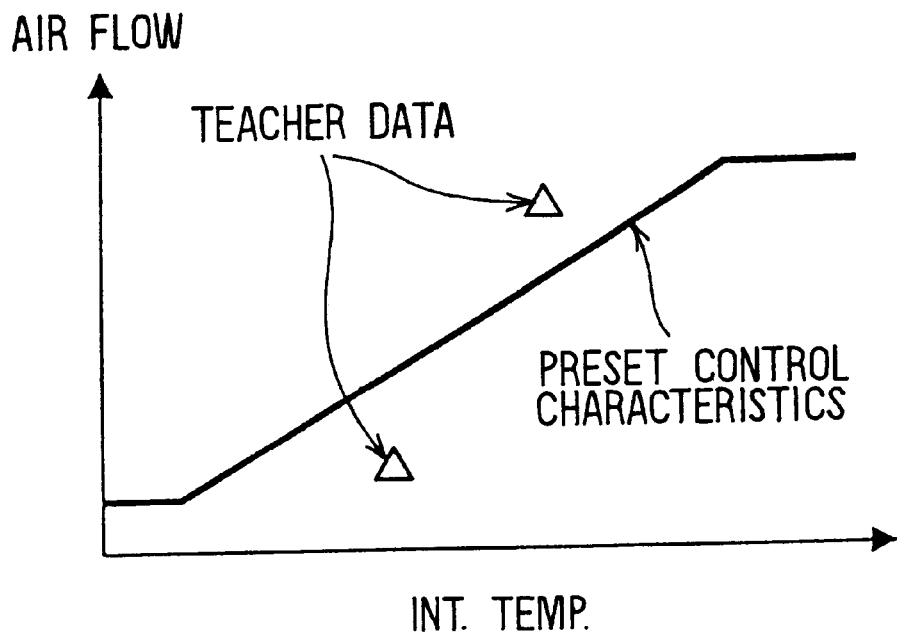
FIGS. 20A and 20B are diagrams illustrating a prior art method of updating a map consisting of airflow control characteristics.
Figure 20B:
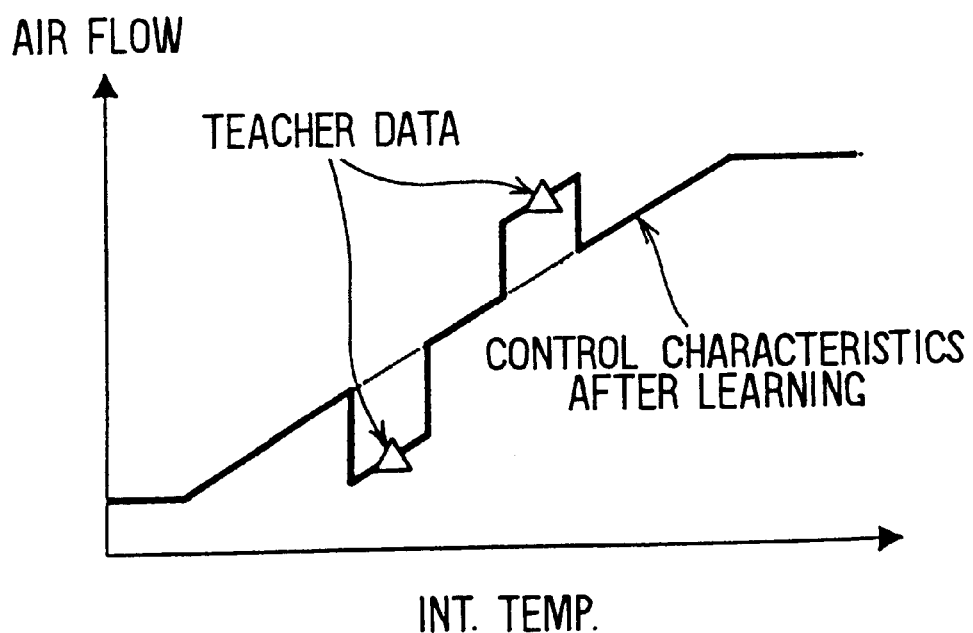
Figure 21A:
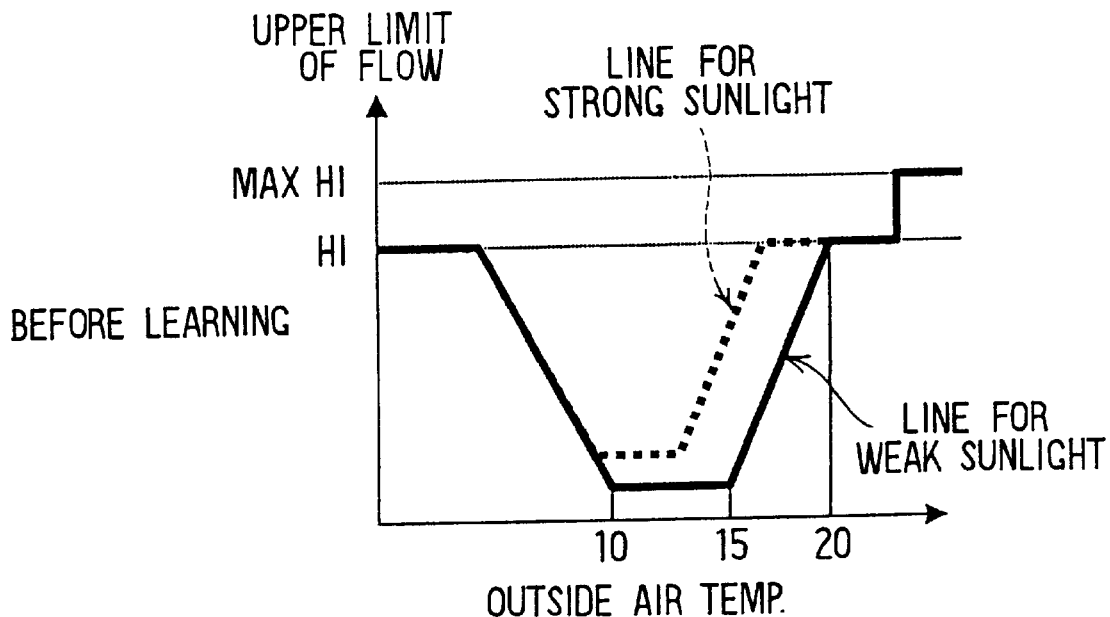
FIGS. 21A and 21B are diagrams illustrating another prior art method of updating a map consisting of airflow control characteristics.
Figure 21B:
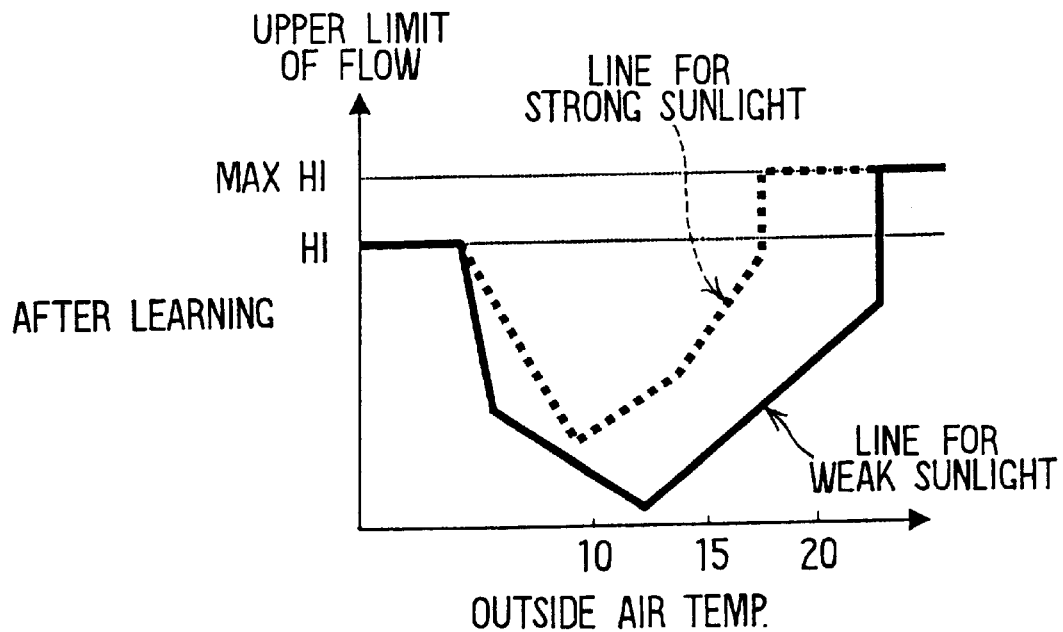

As described already in connection with FIG. 16, in conventional control systems, the n-dimensional input space is divided into subspaces. Controlled variables are made to correspond to the vertices of the subspaces, and those controlled variables corresponding to points inside the subspaces are calculated by bilinear interpolation. If the input space is a two-dimensional input space as shown in FIG. 16, i.e., calculation is based on two input signals, the amount of calculation increases as given by Eq. (3) above. As the number of input signals increases, the number of calculations increase.

On the other hand, the controlled variable-calculating apparatus in accordance with the present embodiment determines a subspace j corresponding to interior temperature (x), amount of sunlight (y), and outside air temperature (z) that are environmental conditions sent from the environmental condition-detecting block 11. Using equation $f^j(x, y, z)$ about a flat plane corresponding to the subspace j, the airflow blw is calculated, as given by Eq. (6). Consequently, it is quite easy to calculate the controlled variable.

In the learning mode described above, if the airflow is modified via the airflow change switch 16, this switch 16 sends teacher data (x, y, z, w) (i.e., the modified airflow w and the interior temperature (x), amount of sunlight (y), and outside temperature (z) entered from the environmental condition-detecting block 11 at the time of correction) to the teacher data storage portion 15.

The teacher data storage portion 15 stores the teacher data (x, y, z, w) in a nonvolatile memory, and makes a decision as to what subspace the teacher data (x, y, z, w) corresponds to, i.e., to what subspace a point (x, y, z) within a three-dimensional space determined by interior temperature (x), amount of sunlight (y), and outside air temperature (z) belongs. The teacher data storage portion 15 searches itself for teacher data $(x_1, y_1, z_1, w_1), (x_2, y_2, z_2, w_2), \ldots, (x_k, y_k, z_k, w_k)$ corresponding the subspace j of the stored teacher data. The resulting teacher data is then sent to the airflow control characteristics-updating portion 14. For convenience, the teacher data will hereinafter be denoted by $(x_i, y_i, z_i, w_i)$ (i=1, 2, 3, ..., k), where the subscript j indicates the order in which each data item is stored in the nonvolatile memory of the teacher data storage portion 15. Therefore, the teacher data (x, y, z, w) delivered from the airflow change switch 16 just now indicates the kth teacher data item $(x_k, y_k, z_k, w_k)$ The airflow control characteristics-updating portion 14 updates the plane coefficients stored in the plane coefficient database 13 according to these k teacher data items $(x_i, y_i, z_i, w_i)$ (i=1, 2, 3, ..., k). The plane coefficient database 13 holds the plane coefficients $(a_1, b_1, c_1, d_1)$, $(a^2, b^2, c^2, d^2)$, ..., $(a_N, b_N, c_N, d_N)$ determining equations for N flat planes corresponding to N subspaces (see FIG. 4). Let $(a^j_0, b^j_0, c^j_0, d^j_0)$ be the initial values of the plane coefficients corresponding to the subspace j. At first, teacher data $(x_1, y_1, z_1, w_1)$ belonging to the subspace j is produced. Based on the teacher data $(x_1, y_1, z_1, w_1)$, the airflow control characteristics-updating portion 14 updates the plane coefficients $(a^j_0, b^j_0, c^j_0, d^j_0)$ to new plane coefficients $(a^j_1, b^j_1, c^j_1, d^j_1)$. If teacher data belonging to the subspace j is subsequently produced from the airflow change switch 16, the teacher data storage portion 15 produces this teacher data $(x_2, y_2, z_2, w_2)$ and the previously stored teacher data $(x_1, y_1, z_1, w_1)$. Thus, the airflow control characteristics-updating portion 14 updates the plane coefficients $(a^j_1, b^j_1, c^j_1, d^j_1)$ to new plane coefficients $(a^j_2, b^j_2, c^j_2, d^j_2)$ according to the two sets of teacher data $(x_1, y_1, z_1, w_1)$ and $(x_2, y_2, z_2, w_2)$. The airflow control characteristics-updating portion 14 continues to update the plane coefficients in this manner. That is, the airflow control characteristics-updating portion 14 updates the already found plane coefficients $(a^j_{k-1}, b^j_{k-1}, c^j_{k-1}, d^j_{k-1})$ to $(a^j_k, b^j_k, c^j_k, d^j_k)$ according to k teacher data items $(x_i, y_i, z_i, w_i)$ (i=1, 2, 3, ..., k).

More specifically, in the present embodiment, the airflow control characteristics-updating portion 14 solves simultaneous equations given by Eq. (7) to find the plane coefficients $(a^j_k, b^j_k, c^j_k, d^j_k)$.

$$\begin{pmatrix} x_1 & y_1 & \ldots & z_1 & 1 \\ x_2 & y_2 & \ldots & z_2 & 1 \\ \vdots & \vdots & & \vdots & \vdots \\ x_k & y_k & \ldots & z_k & 1 \end{pmatrix} \begin{pmatrix} a^j_k \\ b^j_k \\ \vdots \\ c^j_k \\ d^j_k \end{pmatrix} = \begin{pmatrix} w_1 \\ w_2 \\ \vdots \\ w_k \end{pmatrix} \quad (7)$$

Figure 8:
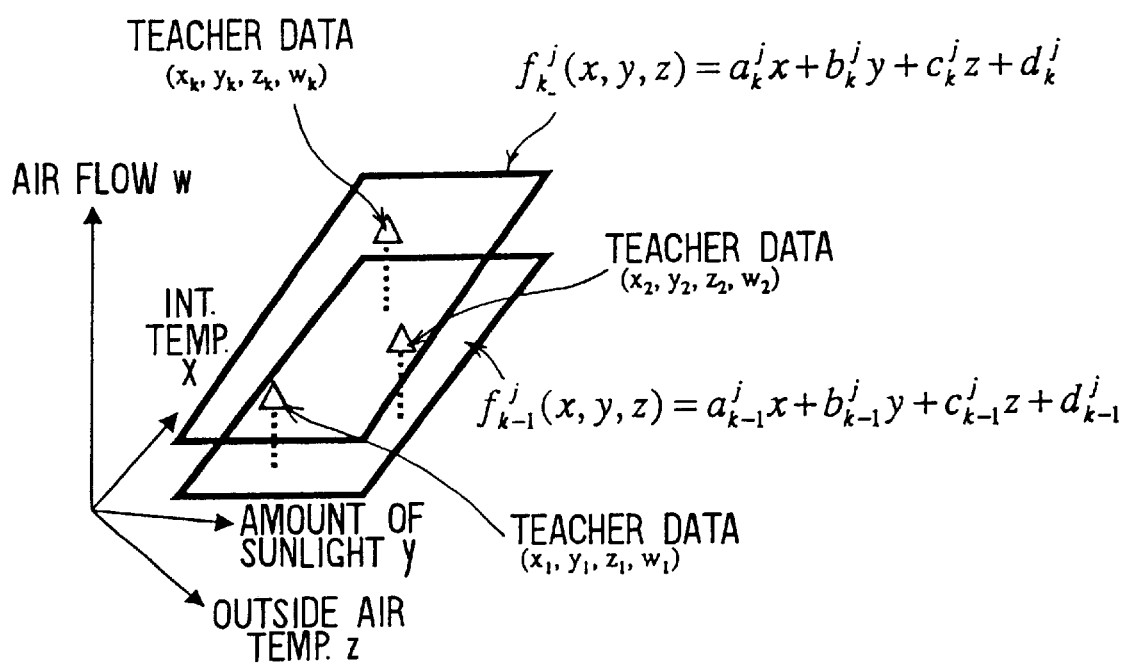
FIG. 8 is a diagram illustrating the manner in which planes are updated according to teacher data.

This set of simultaneous equations might hereinafter to be simply referred to as "Xa=w". Plane coefficients $(a^j_k, b^j_k, c^j_k, d^j_k)$ are calculated as solutions of this set of simultaneous equations. A flat plane given by equations determined by these coefficients $(a^j_k, b^j_k, c^j_k, d^j_k)$ exactly passes through given k teacher data items $(x_i, y_i, \ldots, z_i, w_i)$ (i=1, 2, 3, ..., k). The results are shown in FIG. 8, which depicts an non-updated plane and an updated plane both corresponding to the subspace j embedded in a four-dimensional space defined by four axes of interior temperature (x), amount of sunlight (y), outside air temperature (z), and airflow (w). The non-updated plane is created using an equation $f^j_{k-1} = a^j_{k-1} x + b^j_{k-1} y + c^j_{k-1} z + d^j_{k-1}$ determined by plane coefficients $(a^j_{k-1}, b^j_{k-1}, c^j_{k-1}, d^j_{k-1})$. The updated plane is created using an equation $f^j_k = a^j_k x + b^j_k y + c^j_k z + d^j_k$ determined by the newly calculated plane coefficients $(a^j_k, b^j_k, c^j_k, d^j_k)$ so as to pass through teacher data $(x_1, y_1, z_1, w_1)$, $(x_2, y_2, z_2, w_2)$, and $(x_k, y_k, z_k, w_k)$ Note that the aforementioned k teacher data items do not always lie on the same plane. If so, the simultaneous equations given by Eq. (7) have no solutions. Accordingly, as will be described in detail later, least squares solutions of the simultaneous equations given by Eq. (7) are found.

The matrix X at the left side of Eq. (7) is not always a square matrix. Sometimes, as in the following example, it may be singular. For these reasons, a method (such as the Gauss-Jordan method) of solving simultaneous equations based on the assumption that the matrix is square and non singular cannot be used.

(1) There are less than 4 sets of teacher data for found plane coefficients ($a^j_k$, $b^j_k$, $c^j_k$, $d^j_k$). In this case, the simultaneous equations xa=w takes a form as given by Eq. (8) below.

$$\begin{pmatrix} x_1 & y_1 & z_1 & 1 \\ x_2 & y_2 & z_2 & 1 \end{pmatrix} \begin{pmatrix} a^j_k \\ b^j_k \\ c^j_k \\ d^j_k \end{pmatrix} = \begin{pmatrix} w_1 \\ w_2 \end{pmatrix} \tag{8}$$

Figure 9A:
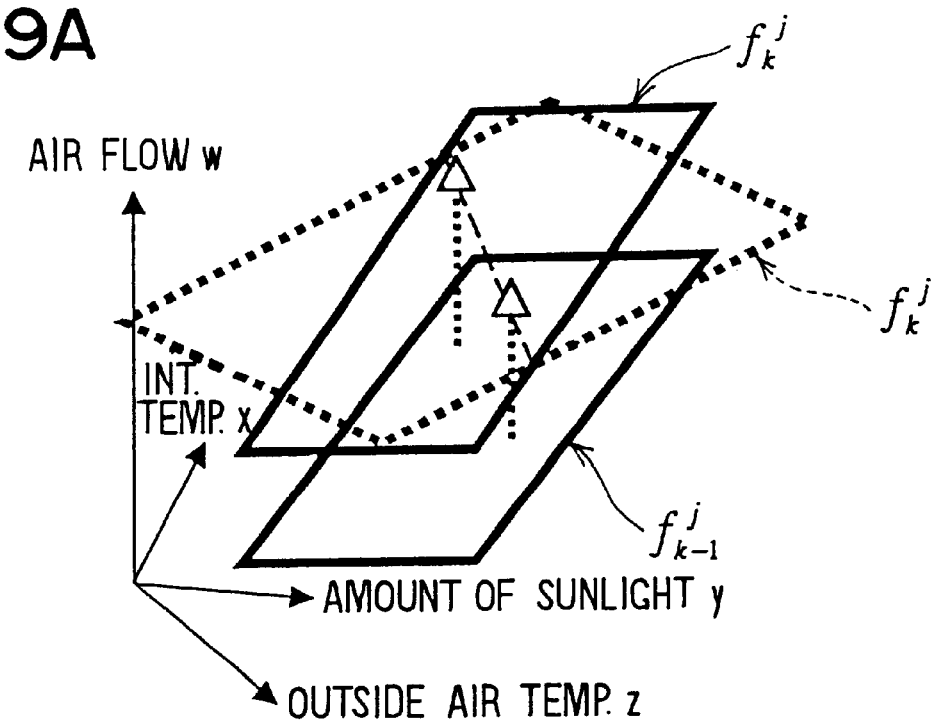
FIGS. 9A and 9B are diagrams illustrating the manner in which planes are not uniquely determined from teacher data.

In this case, since only a limited number of teacher data items are available, equation $f^j_k$ about a flat plane cannot be uniquely determined, as shown in FIG. 9A.

(2) Even where the number of sets of teacher data are 4 or more, if those of the equations determined from the teacher data which are linearly independent of each other are less than 3, the present situation holds (e.g., neither amount of sunlight nor outside air temperature has changed; only interior temperature has varied). In particular, it is assumed that the airflow is modified to levels 28, 25, 21, 18, and 16 under conditions where the amount of sunlight of 0 W/cm², the outside air temperature is 20° C., and the interior temperatures are 40, 37, 33, 30, and 28° C. In this case, the simultaneous equations Xa=w takes a form as given by Eq. (9).

$$\begin{pmatrix} 40 & 0 & 20 & 1 \\ 37 & 0 & 20 & 1 \\ 33 & 0 & 20 & 1 \\ 30 & 0 & 20 & 1 \\ 28 & 0 & 20 & 1 \end{pmatrix} \begin{pmatrix} a^j_k \\ b^j_k \\ c^j_k \\ d^j_k \end{pmatrix} = \begin{pmatrix} 28 \\ 25 \\ 21 \\ 18 \\ 16 \end{pmatrix} \tag{9}$$

Figure 9B:
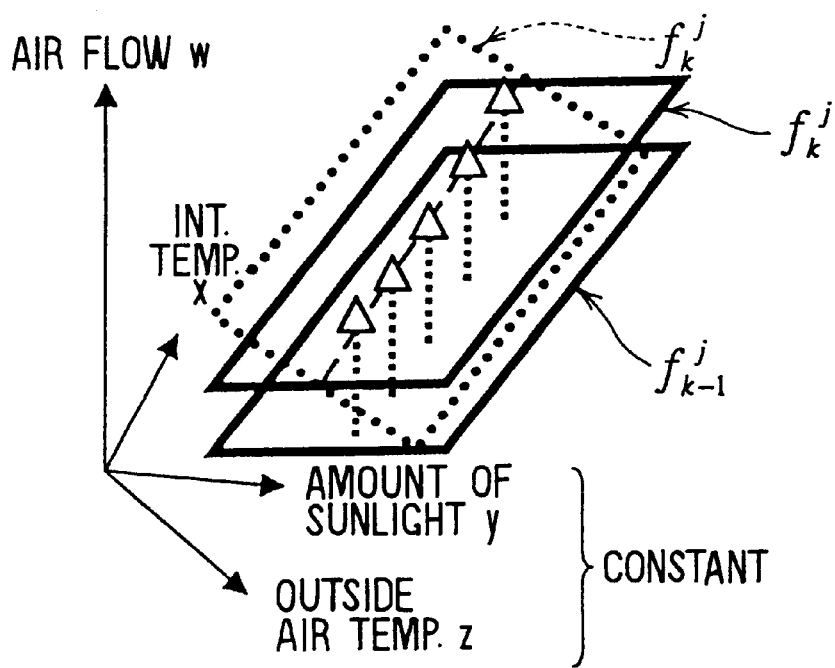

In this case, the teacher data items are aligned as shown in FIG. 9B and so the equation $f^j_k$ for a plane cannot be uniquely determined.

The situation (1) above inevitably occurs in the initial phase of a learning process. The situation (2) is highly likely to occur where the present embodiment is considered, because such situations in which neither the outside air temperature nor the amount of sunlight varies, but only the interior temperature varies, frequently occur.

Accordingly, the present embodiment introduces an index E given by Eq. (10), and solutions of the simultaneous equations Xa=w given by Eq. (7) are found.

$$E = \int\int\int_{D_j} (f^j_k - f^j_{k-1})^2 dx\,dy\,dz \tag{10}$$

If $f^j_k$ is an equation for a flat plane determined by the updated plane coefficients ($a^j_k$, $b^j_k$, $c^j_k$, $d^j_k$), $f^j_{k-1}$ is an equation for a flat plane determined by the unupdated plane coefficients ($a^j_{k-1}$, $b^j_{k-1}$, $c^j_{k-1}$, $d^j_{k-1}$), and $D_j$ is the subspace j, it follows that the amount of correction is $f^j_k - f^j_{k-1}$. Therefore, Eq. (10) means that the squares of the amount of modification are integrated in the subspace $D_j$, and gives an index for the total sum of amounts of correction.

Figure 10:
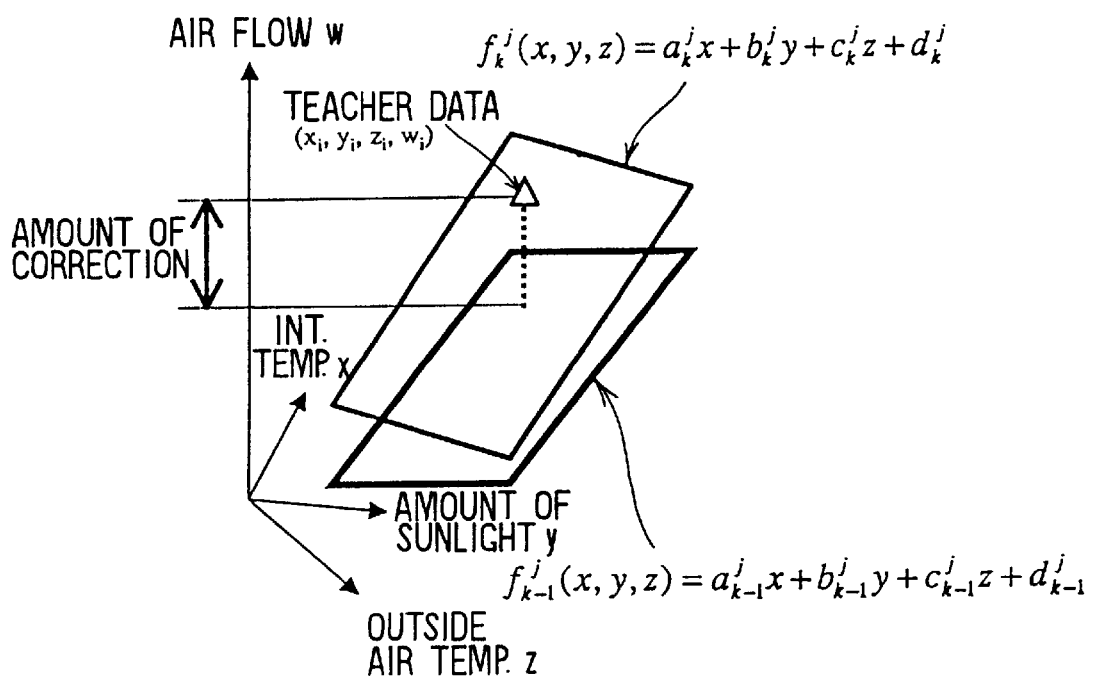
FIG. 10 is a diagram illustrating the amount of amendment made to a flat plane by updating of the plane.

In the present embodiment, solutions or least squares solutions of the simultaneous equations Xa=w of Eq. (7) which minimize the index E given by Eq. (10) are found. For example, FIG. 10 shows the amount of correction arising from updating of the planes as described above. In the Figure, an amount of correction corresponding to teacher data ($x_i$, $y_i$, $z_i$, $w_i$) is shown. Eq. (10) gives the total of the squares of such amounts of correction over the whole subspace j.

The underlying concept is that it is ideal to find a new equation $f^j_k$ about a flat plane so as to minimize the modification of the flat plane defined by the equation $f^j_{k-1}$, because the flat plane defined by the equation $f^j_{k-1}$ has been updated based on the teacher data up to the (k-1)-th data items, and thus reflects the user's preferences.

Figure 11A:
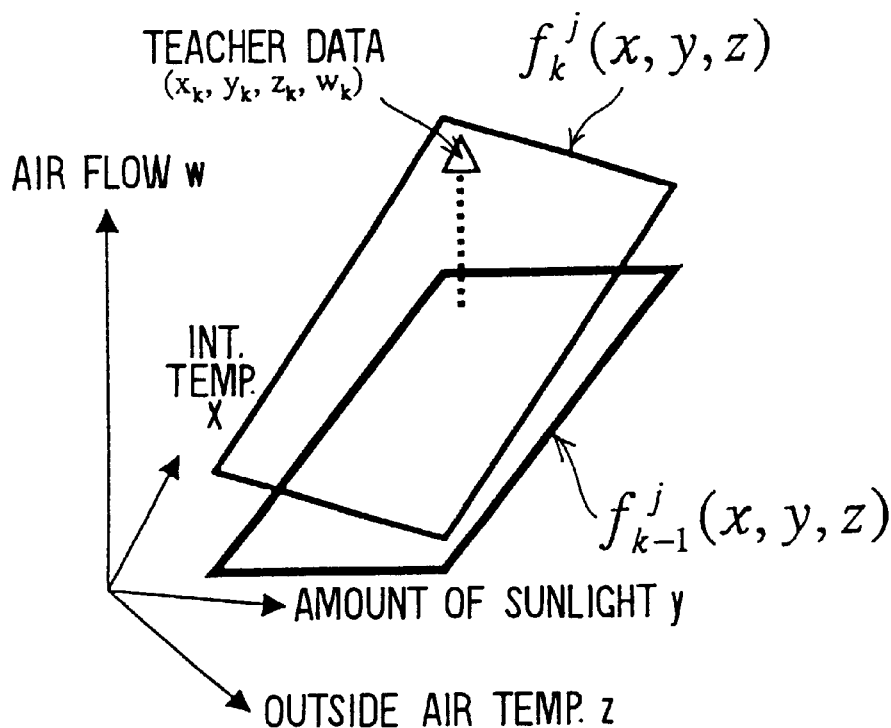
FIGS. 11A and 11B are diagrams illustrating planes updated under the condition where the sum of correction is minimal.
Figure 11B:
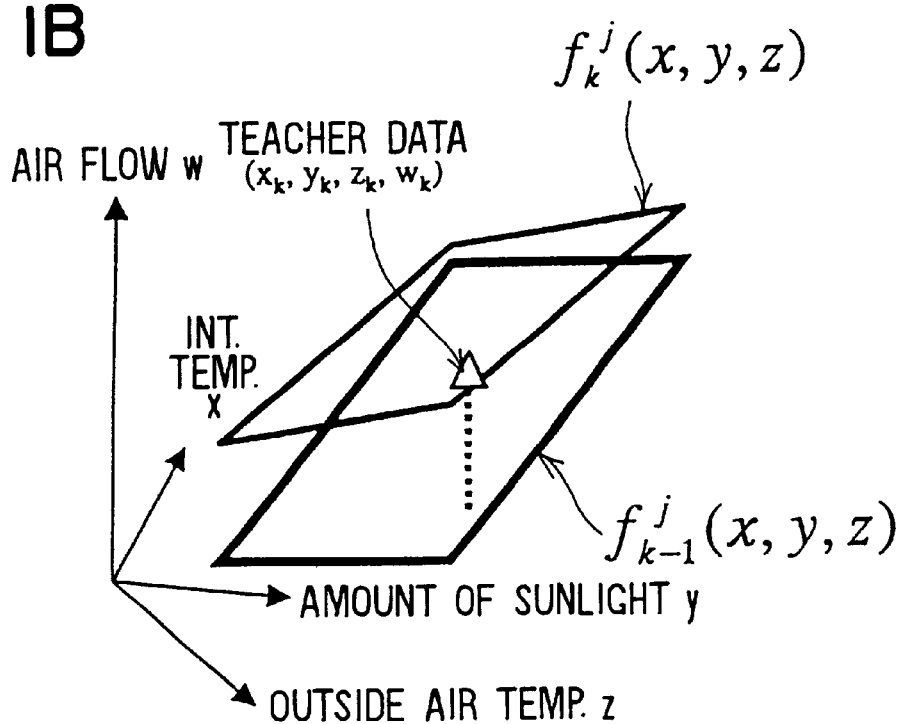

The simultaneous equations Xa=w given by Eq. (7) can be uniquely solved under conditions where the index given by Eq. (10) is reduced to a minimum. A flat plane created by the equation found by this method greatly modifies the vicinities of the k-th teacher data items ($x_k$, $y_k$, $z_k$, $w_k$) and modifies to a lesser degree more remote portions as shown in FIG. 11A and FIG. 11B. In this way, the kth teacher data items ($x_k$, $y_k$, $z_k$, $w_k$) that are the newest teacher data items are reflected, and effective use is made of the results of learning made to that point.

Therefore, the plane coefficients determining the plane equation $f^j_k$ are updated using teacher data consisting of the airflow w modified via the airflow change switch 16 and environmental conditions discussed above at the time of the modification. A combination of planes defined by equations determined by the plane coefficients approximates a surface that represents airflow control characteristics.

Accordingly, if the approximation accuracy is enhanced by making flat planes sufficiently small, updating of the equations for flat planes using teacher data enables learning of a surface, which would normally be difficult to achieve. That is, in the present invention, a surface embedded in the (n+1)-dimensional space is approximated by flat planes, and these flat planes are updated. This is equivalent to updating of plane position and curvature data at each portion on the surface. That is, learning according to the invention is quite close to the aforementioned ideal learning.

Furthermore, the plane created by the equation determined from the plane coefficients calculated by the aforementioned method passes through the teacher data with maximum accuracy. As a result, it accurately reflects the user's preferences.

Figure 12A:
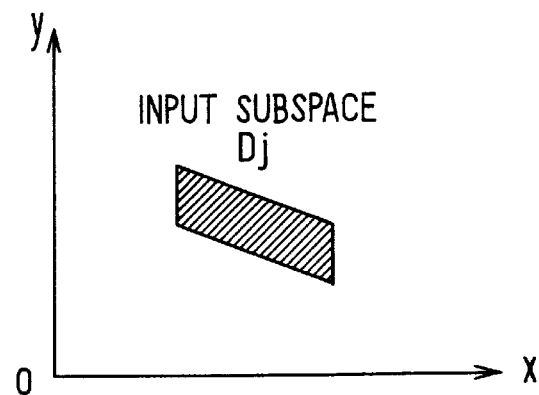
FIGS. 12A and 12B are diagrams illustrating coordinate translation in an input subspace.
Figure 12B:
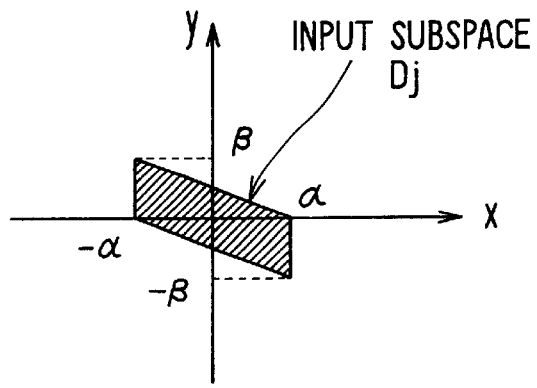

A specific example of a method in accordance with the present embodiment is given below. In the present embodiment, solutions of the simultaneous equations given by Eq. (7) that minimize the index E of Eq. (10) are calculated by variable conversion and singular value decomposition techniques.

Where the subspace $D_j$ satisfies the relationships relations $-\alpha \leq x \leq \alpha$, $-\beta \leq y \leq \beta$, ..., $-\gamma \leq z \leq \gamma$, Eq. (10) takes the form of Eq. (11). If the subspace $D_j$ does not satisfy these relationships, appropriate coordinate translations are performed. For example, some input subspace $D_j$ is in an arbitrary position within a flat plane as shown in FIG. 12A. Coordinate translation is performed to bring the origin into the centers of the input subspace $D_j$ taken in the directions of the X- and Y-axis, respectively, as shown in FIG. 12B.

$$\int_{-\gamma}^{\gamma}\int_{-\beta}^{\beta}\int_{-\alpha}^{\alpha} (f^j_k - f^j_{k-1})^2 dx\,dy\,dz \tag{11}$$

Using the equation $f^j_{k-1} = a^j_{k-1}x + b^j_{k-1}y + c^j_{k-1}z + d^j_{k-1}$ and the equation $f^j_k = a^j_k x + b^j_k y + c^j_k z + d^j_k$, the Eq. (11) is calculated. The results are given by Eq. (12), which is the sum of weighted squares of the differences between the coefficients of $\tilde{f}_{k-1}$ and $\tilde{f}_k$.

$$\frac{8\alpha\beta\gamma}{3}\{\alpha^2(a_k^j - a_{k-1}^j)^2 + \beta^2(b_k^j - b_{k-1}^j)^2 + \gamma^2(c_k^j - c_{k-1}^j)^2 + 3(d_k^j - d_{k-1}^j)^2\} \quad (12)$$

Therefore, the plane coefficients ($a_k^j$, $b_k^j$, $c_k^j$, $d_k^j$) can be determined by solving the simultaneous equations given by Eq. (7) under conditions where the value of Eq. (12) is minimized.

When the k-th teacher data items are given, the plane coefficients ($a_{k-1}^j$, $b_{k-1}^j$, $c_{k-1}^j$, $d_{k-1}^j$) regarding the teacher data items up to the (k−1)-th data item have been calculated. Therefore, $a_{k-1}^j x_i + b_{k-1}^j y_i + c_{k-1}^j z_i + d_{k-1}^j$ can be calculated for the i-th teacher data item ($x_i$, $y_i$, $z_i$, $w_i$) (i=1, 2, 3, . . . , k). As a result, $wc_i$ is calculated as shown by Eq. (13).

$$a_{k-1}^j x_i + b_{k-1}^j y_i + c_{k-1}^j z_i + d_{k-1}^j = wc_i \quad (13)$$

The i-th row of Eq. (7) is taken and given by $$a_k^j x_i + b_k^j y_i + c_k^j z_i + d_k^j = w_i \quad (14)$$

Taking the difference between the left hands of Eqs. (13) and (14) and the difference between the right hands gives $$(a_k^j - a_{k-1}^j)x_i + (b_k^j - b_{k-1}^j)y_i + (c_k^j - c_{k-1}^j)z_i + (d_k^j - d_{k-1}^j) = w_i - wc_i \quad (15)$$

Figure 13:
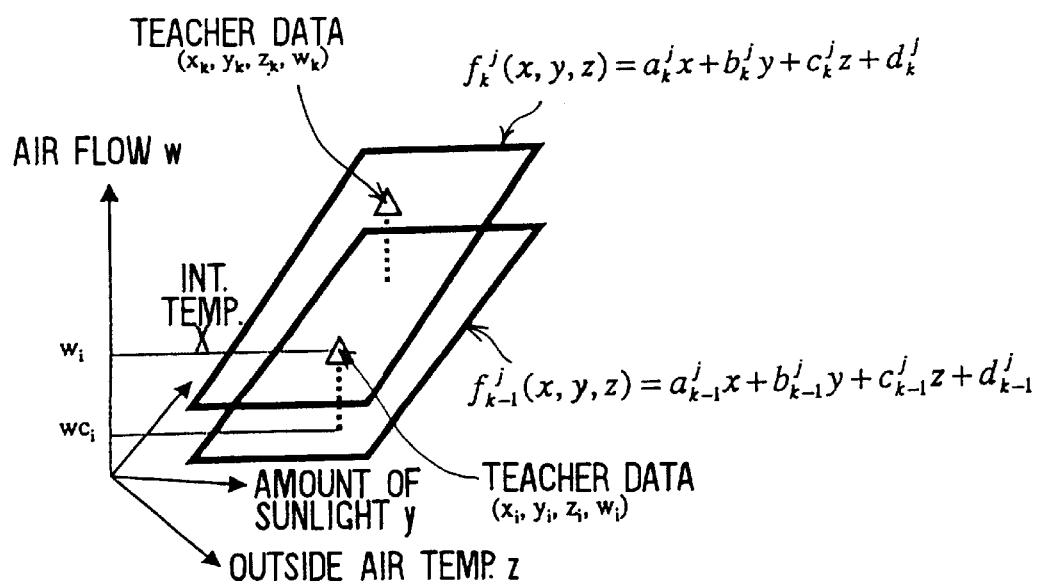
FIG. 13 is a diagram depicting images corresponding to variable conversion.

Eq. (15); indicates the amount of correction to the teacher data ($x_i$, $y_i$, . . . , $z_i$, $w_i$) (i=0, 1, 2, . . . , k) as shown in FIG. 13. Subsequently, Eq. (15) is subjected to variable conversion given by Eq. (16).

$$\begin{cases} A = \alpha(a_k^j - a_{k-1}^j) \\ B = \beta(b_k^j - b_{k-1}^j) \\ C = \gamma(c_k^j - c_{k-1}^j) \\ D = \sqrt{3}(d_k^j - d_{k-1}^j) \end{cases} \quad (16)$$

This is summarized about i=1, 2, 3, . . . , k, resulting in $$\frac{A}{\alpha}x_i + \frac{B}{\beta}y_i + \frac{C}{\gamma}z_i + \frac{D}{\sqrt{3}} = w_i - wc_i \quad (17)$$

The above is summarized about i=1, 2, 3, . . . , k, resulting in the following Eq. (18):

$$\begin{pmatrix} \frac{x_1}{\alpha} & \frac{y_1}{\beta} & \frac{z_1}{\gamma} & \frac{1}{\sqrt{3}} \\ \frac{x_1}{\alpha} & \frac{y_1}{\beta} & \frac{z_1}{\gamma} & \frac{1}{\sqrt{3}} \\ \vdots & \vdots & \vdots & \vdots \\ \frac{x_1}{\alpha} & \frac{y_1}{\beta} & \frac{z_1}{\gamma} & \frac{1}{\sqrt{3}} \end{pmatrix} \begin{pmatrix} A \\ B \\ C \\ D \end{pmatrix} = \begin{pmatrix} w_1 - wc_1 \\ w_2 - wc_2 \\ \vdots \\ w_k - wc_k \end{pmatrix} \quad (18)$$

Applying Eq. (16) to Eq. (12) results in Eq. (19):

$$E = \frac{8\alpha\beta\gamma}{3}(A^2 + B^2 + C^2 + D^2) \quad (19)$$

As a result of variable conversion performed thus far, the problem that the simultaneous equations of Eq. (7) are solved under conditions where the value of Eq. (10) is minimized is converted into a problem that Eq. (18) is solved under conditions where Eq. (19) is minimized. This problem can be solved by well-known singular value decomposition techniques.

A method of solving simultaneous equations by singular value decomposition techniques will now be described. Assume that the following simultaneous equations are given by Eq. (20).

$$Ax = b \quad (20)$$

Note that variable names used above are different from variable names in the present embodiment. In the above equation, A is a matrix of M rows and N columns, x is an N-dimensional column vector, and b is an M-dimensional column vector. It is assumed that M simultaneous equations in this Eq. (20) are linearly independent of each other.

At this time, if M<N, a supplemental column of 0's is previously inserted under the matrix A at the left side to create a square matrix of N rows and N columns. Similarly, a supplemental 0 is inserted to the vector b at the right side, thus creating an N-dimensional column vector.

An arbitrary matrix A of M rows and N or more columns can be decomposed into the product of three matrices as given by $$A = UWV^t \quad (21)$$

where U is a, column-orthogonal matrix of M rows and N columns, W is a diagonal matrix of N rows and N columns, and Vt is a transpose of an orthogonal matrix V of N rows and N columns.

A solution of Eq. (20) is found by $$x = V[diag(1/w_j)]U^t b \quad (22)$$

The solution obtained by Eq. (22) has the following properties.

A) If Eq. (20) has a solution, i.e., if a value of x exists that satisfies the relation Ax=b, then the vector x is a strict solution of Eq. (20).

B) If Eq. (20) has no solution, i.e., if a value of x that satisfies the relation Ax=b does not exist, then the vector x is a least squares solution of Eq. (20). That is, x minimizes |Ax−b|.

C) If the matrix A of Eq. (20) is singular, numerous solutions rather than a single solution exist for Eq. (20). Among them, x provides a symbol |x| having a minimum length.

To make use of the property (C) above, x of Eq. (20) is subjected to variable conversion as given by Eq. (16). Thus, x giving |x| having a minimum length reduces Eq. (19) to a minimum value. Where singular value decomposition techniques are utilized, if no solution exists, the relationship (A) described above permits calculation of least squares solutions of Eq. (7) or Eq. (18).

After calculating A, B, C, and D of Eq. (18) by the singular value decomposition techniques described above, the plane coefficients ($a_k^j$, $b_k^j$, $c_k^j$, $d_k^j$) are calculated using Eq. (23) below.

$$\begin{cases} a_k^j = \dfrac{A}{\alpha} + a_{k-1}^j \\ b_k^j = \dfrac{B}{\beta} + b_{k-1}^j \\ c_k^j = \dfrac{C}{\gamma} + c_{k-1}^j \\ d_k^j = \dfrac{D}{\sqrt{3}} + d_{k-1}^j \end{cases} \quad (23)$$

The desired calculation of plane coefficients can thus be accomplished by using variable conversion and singular value decomposition techniques. As another feature of the present embodiment, the plane coefficients are corrected so that the updated flat plane passes through the kth teacher data item in the procedure described below.

First, an amount of correction Δf is calculated using Eq. (24).

$$\Delta f = w_k - f_k^j(x_k, y_k, z_k) \quad (24)$$

The amount of correction Δf is then added to the plane coefficient $d_k^j$ to create a new plane coefficient $d_k^j$.

Figure 14A:
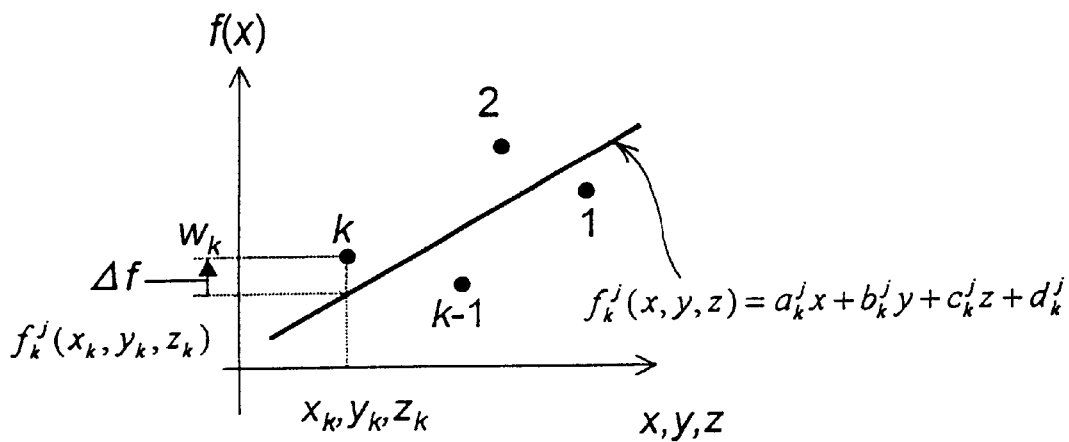
FIGS. 14A and 14B are diagrams illustrating correction of plane coefficients.
Figure 14B:
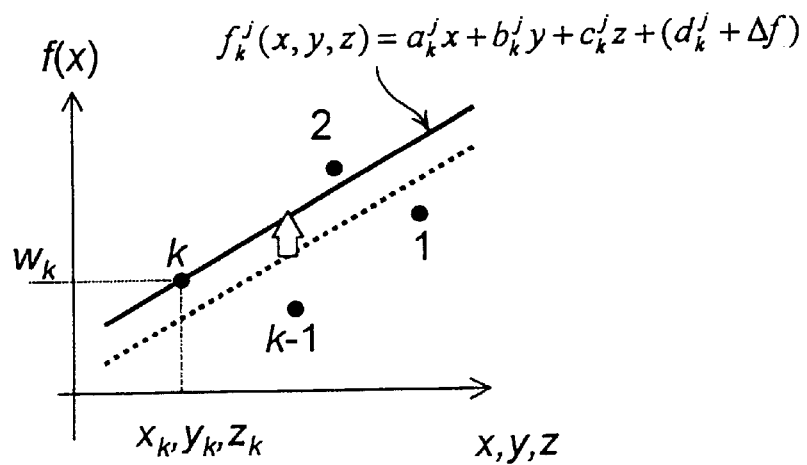
Figure 15:
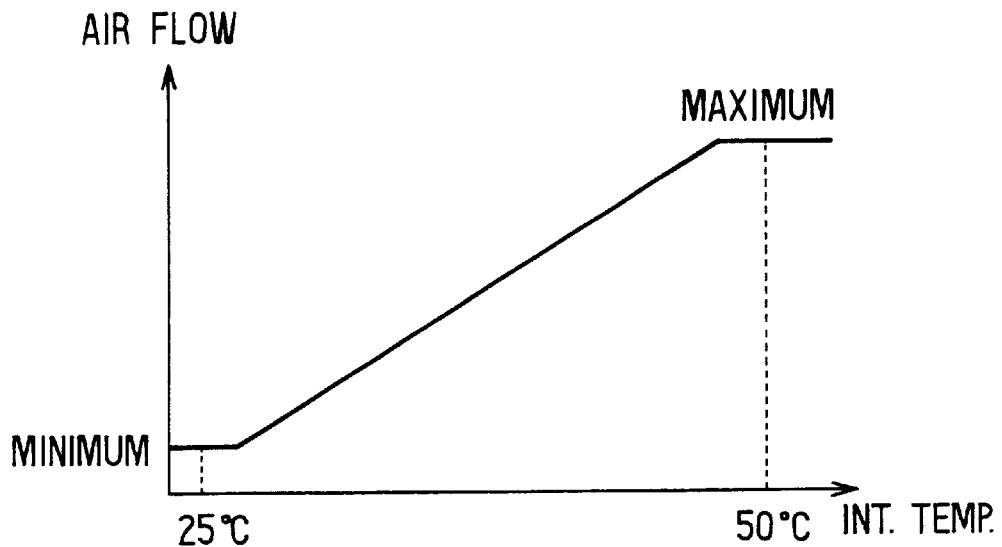
FIG. 15 is a graph showing an example of airflow control characteristics represented as a map for calculating an airflow from the interior temperature of a vehicle.

The equation $f_k^j$ is determined by the plane coefficients ($a_k^j$, $b_k^j$, $c_k^j$, $d_k^j$) computed using the aforementioned singular value decomposition techniques. A flat plane created by this equation $f_k^j$ might be a flat plane that approximates k teacher data items by a least squares approach. In this case, if the teacher data items are not aligned on the same flat plane, the plane does not always pass through the finally given kth teacher data item ($x_k$, $y_k$, $z_k$, $w_k$). The results are shown in FIG. 14A. In particular, if the user modifies the airflow to level 15, the airflow produced after a learning process assumes level 10. In this situation, the correction is not directly reflected. Therefore, the aforementioned correction of the plane coefficient dik assures that the plane passes through the kth teacher data item ($x_k$, $y_k$, $z_k$, $w_k$) as shown in FIG. 14B. In consequence, effective use can be made of the newest correction to the airflow made by the user.

The ACC system in accordance with the present embodiment approximates a surface representing airflow control characteristics by plural flat planes as described in detail above. The gradient of each flat plane is updated according to teacher data.

At this time, if one of the plural flat planes approximating the surface representing the airflow characteristics is updated and thus the boundaries between the updated plane and surrounding flat planes are no longer common, airflows calculated as controlled variables become discontinuous around the boundaries.

As a solution to this problem, the concept of contour lines is introduced to a model of a flat plane shown in FIG. 2B. The results are illustrated in FIG. 5, which shows those of boundaries between the flat planes that give rise to the same calculated airflow by four contour lines 1–4. In the direction of the axis along which interior temperature is plotted, two outer contour lines 1 and 4 show a maximum airflow. Inner contour lines 2 and 3 show a minimum airflow. These contour lines are not interrupted and do not meet with each other. Therefore, it is considered that the integrity of the airflow control characteristics is maintained based on these properties.

The updating portion 14 may be designed to update the equations for flat planes corresponding to the subject subspaces, and to update the equations for the flat planes such that the boundaries between adjacent flat planes are made common.

Figure 5A:
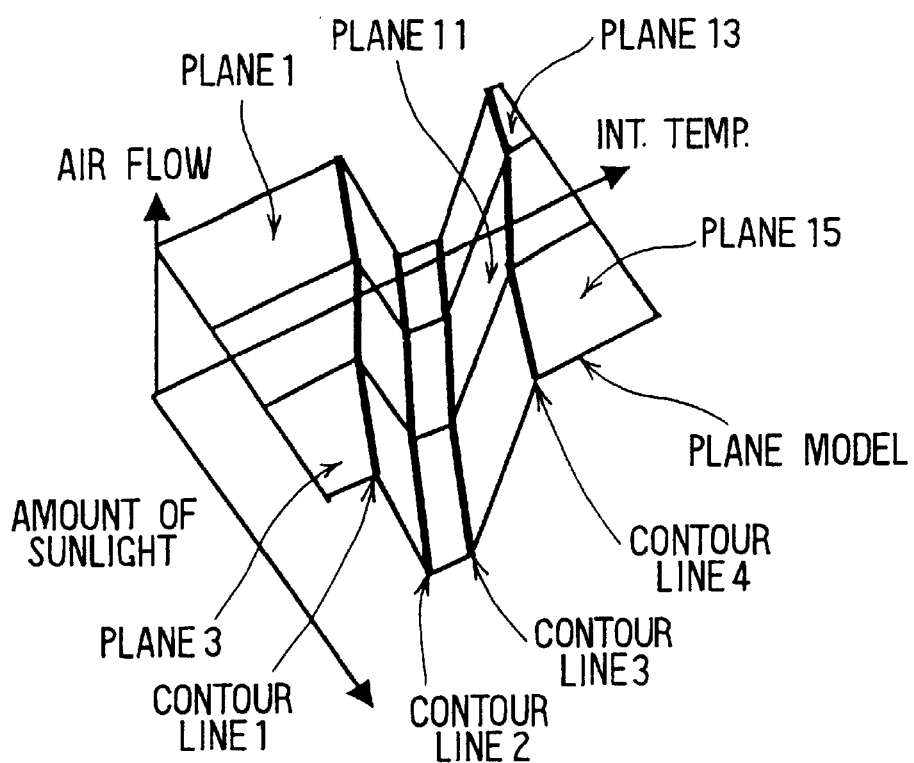
FIGS. 5A and 5B are diagrams illustrating contour lines introduced to a plane model.
Figure 6A:
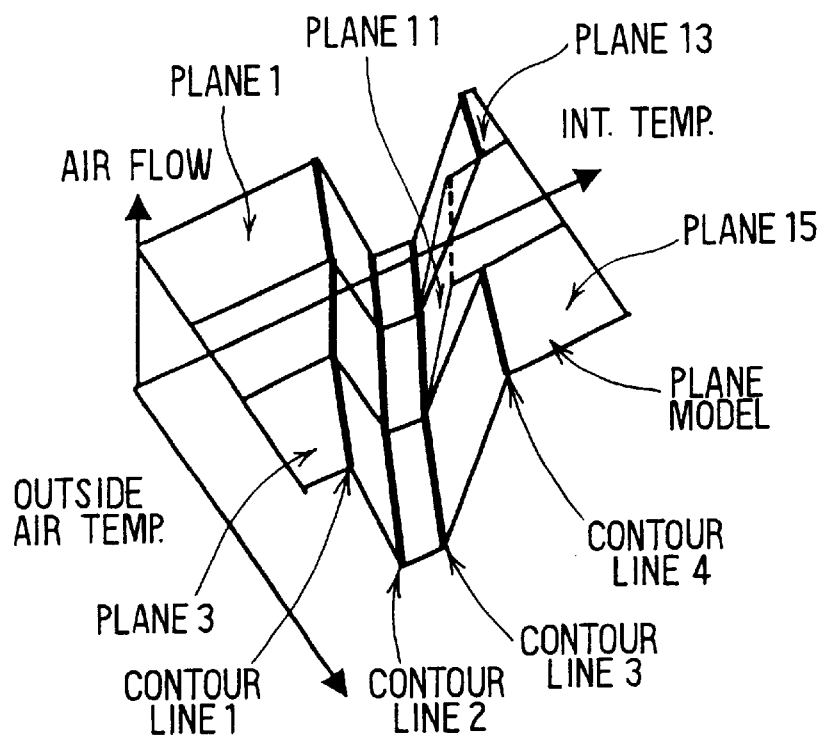
FIGS. 6A and 6B are diagrams illustrating the manner in which some contour lines are interrupted by updating of flat planes of the plane model.
Figure 7A:
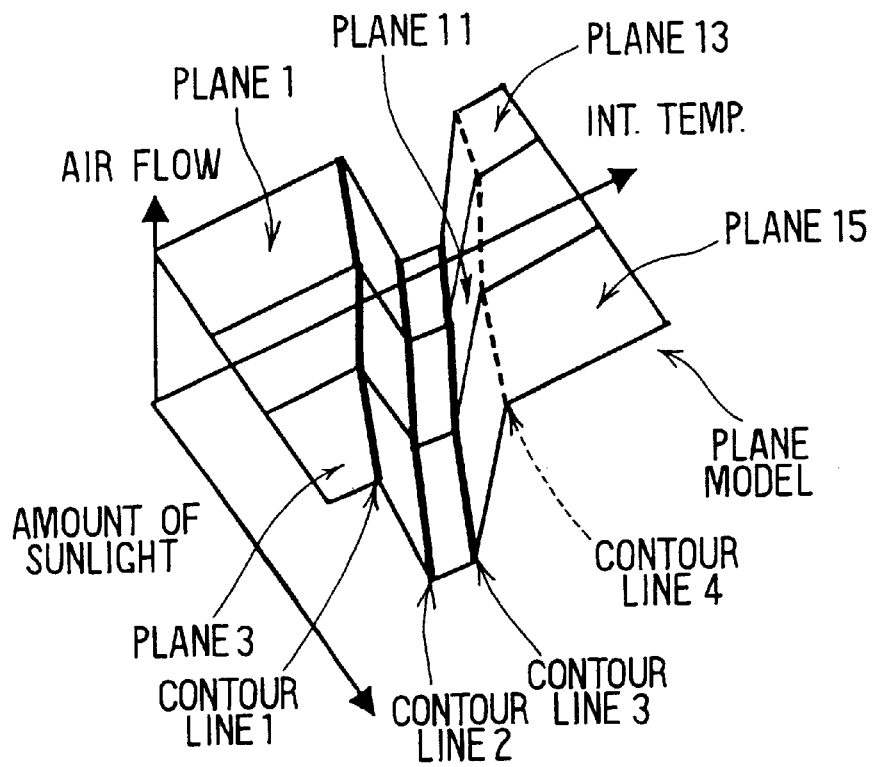
FIGS. 7A and 7B are diagrams illustrating the manner in which contour lines are amended by a global learning process.

A specific example of a procedure for making the boundaries between adjacent flat planes common is illustrated in FIG. 5A, which depicts a flat plane model representing airflow control characteristics. With respect to this model, introduction of the concept of contour lines to the boundaries between flat planes to make equal calculated airflows may be contemplated. In FIG. 5A, 4 contour lines 1–4 are shown for a boundary between flat planes. If the contour line 4 is interrupted by modification of the equations for the flat plane 11 as illustrated in FIG. 6A, the equations for the surrounding flat planes are modified to make continuous the contour line 4, as shown in FIG. 7A. Therefore, the calculated controlled variable is kept from becoming discontinuous. Consequently, control based on the controlled variable is prevented from becoming discontinuous.

Figure 5B:
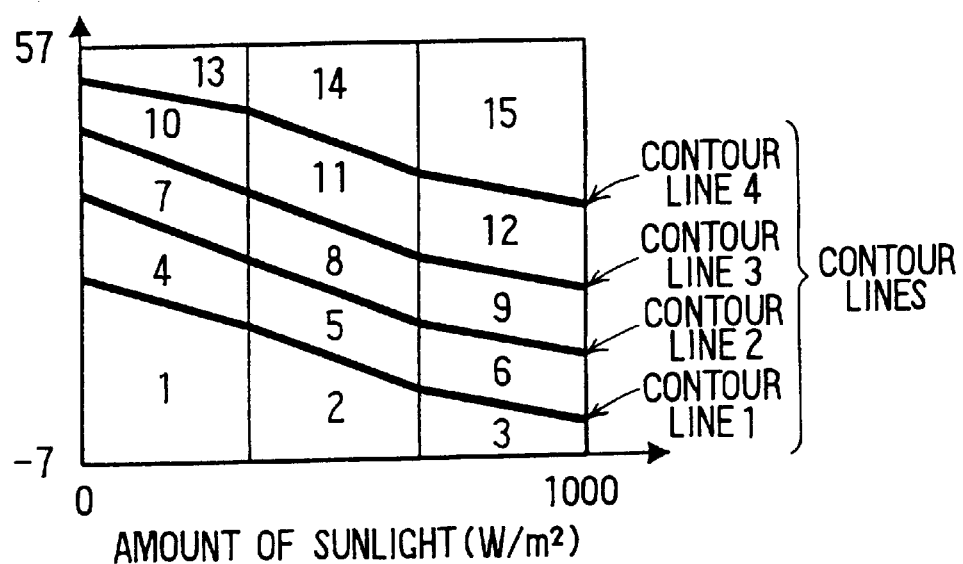
Figure 6B:
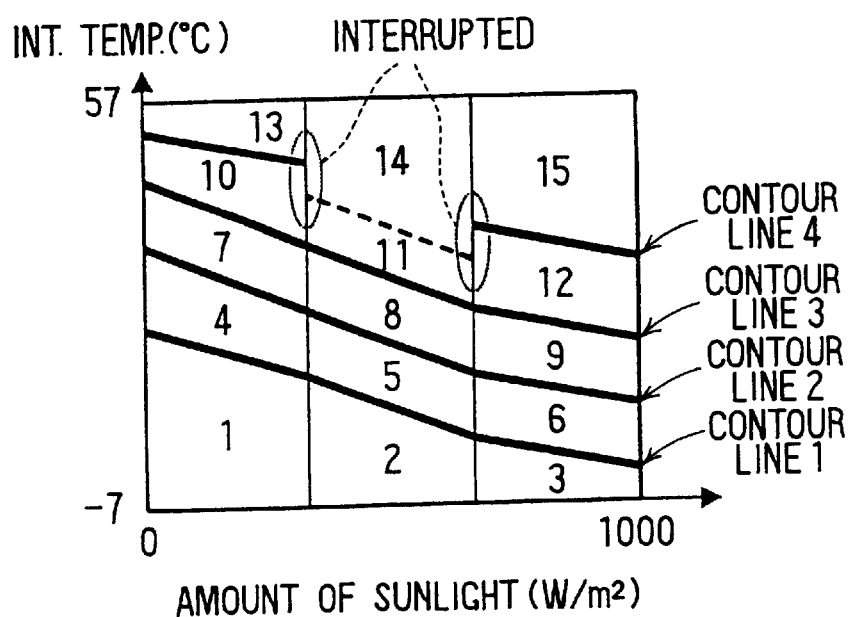

If the equations for flat planes corresponding to the subject subspaces are modified by the learning control device, the regions of the subject subspaces might not be appropriate for the equations for the flat planes. For example, if the gradient of the flat plane 11 is changed without varying the area of the flat plane 11 as, shown in FIG. 6A, and if the modified model of flat planes is projected onto a flat plane defined by two axes of the interior temperature and the amount of sunlight, respectively, the subspace 11 (FIG. 6B) becomes narrower than the original subspace 11 (FIG. 5B). Therefore, it is necessary to update the boundaries between subspaces according to the modification of the equations for the flat plane 11 in such a way that the region of the subspace 11 is narrowed and that the region of the subspace 14 is widened.

Accordingly, the learning control device 14 may update the boundaries between the corresponding subspaces according to the updating of the equations for flat planes. The updating of the equations for flat planes embraces updating of the equations for flat planes for making common the boundaries between flat planes, as well as the updating of the equations for the flat planes corresponding to the subject subspaces.

Figure 7B:
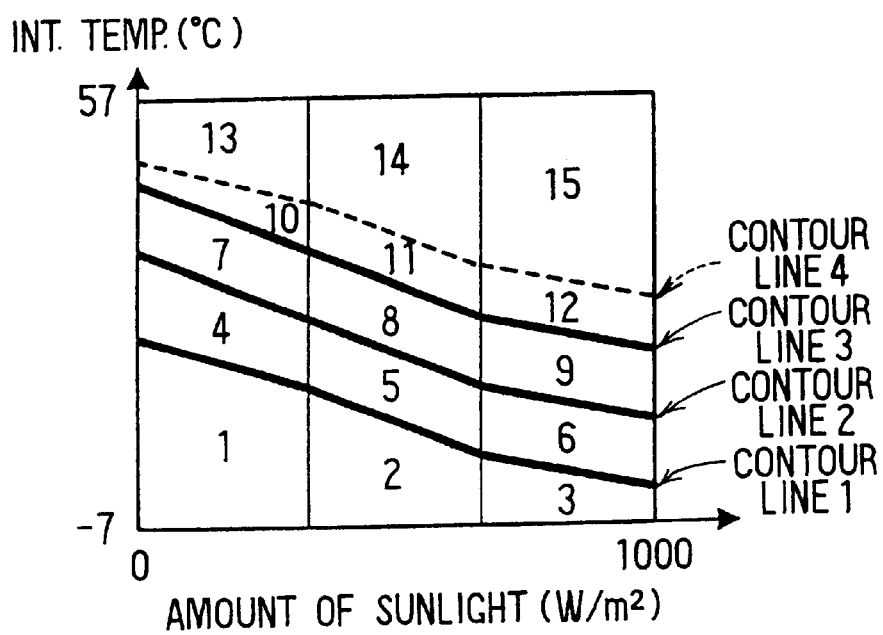

Therefore, if the equations for flat planes are updated to maintain the integrity of the entire model of flat planes as illustrated in FIG. 7A, three boundaries, i.e., the boundary between the subspaces 10 and 13, the boundary between the subspaces 11 and 14, and the boundary between the subspaces 12 and 15, are updated, as shown in FIG. 7B.

On the other hands, the singular value decomposition needs many calculations and needs a floating-point arithmetic. Therefore. although this singular value decomposition can easily realized by using a calculator having a high-speed floating-point arithmetic CPU such as a personal computer, it may take a long time to be calculated by a calculator having a low-speed fixed-point arithmetic CPU such as one mounted on the vehicle. Hereinafter, a typical value search technique, which can realize even by the low-speed fixed-point arithmetic CPU, will be explained.

Figure 22:
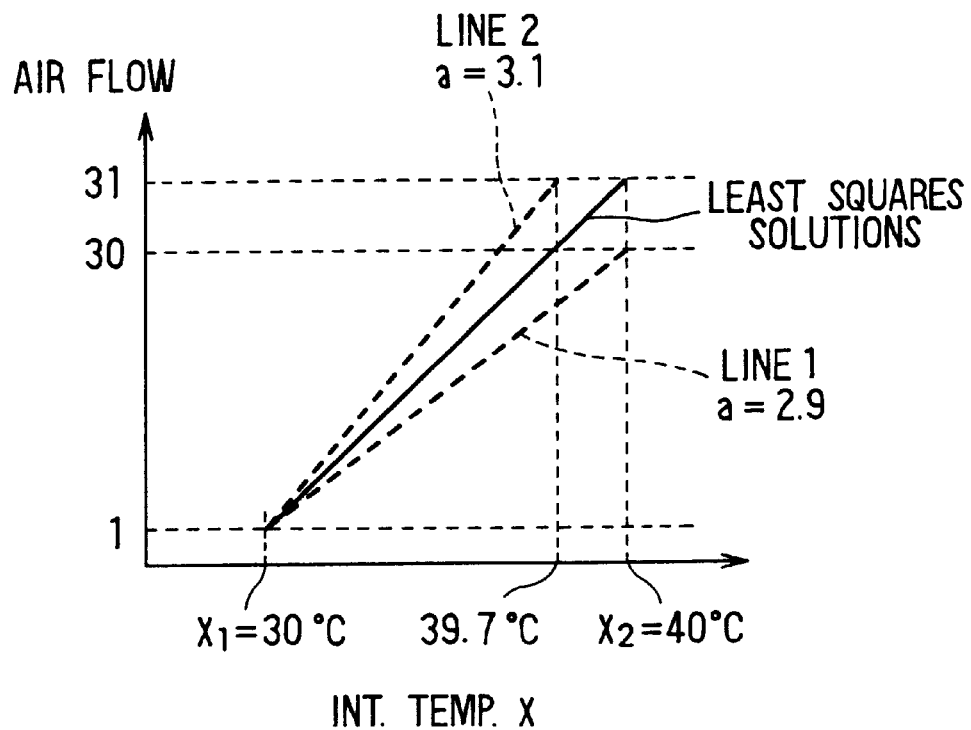
FIG. 22 is a graph illustrating least square solutions, and tolerance discontinuity ranges with respect to the interior temperature.
Figure 28:
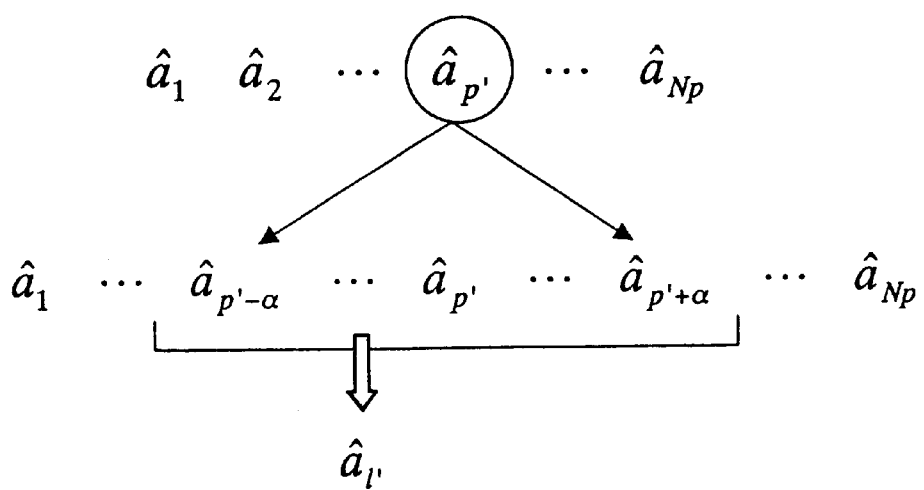
FIG. 28 is a diagram illustrating a search range restriction of selectable typical values.

In the case where the present invention is applied to the vehicular air-conditioning system as well as the above-described embodiment, it is not necessary to exactly calculate the least square solutions by the Eq. (7). For example, in the airflow control, the airflow level is divided to 30 steps including from level 1 (minimum level) to level 31 (maximum level). The airflow below or beyond this range is clipped to one of from level 1 to level 31. Here, there is no practical difference if the airflow level is deviated by 1 or 2 levels in an equation about a flat plane, which is calculated by exactly solving the Eq. (7). FIG. 22 is a graph in which the least square equations with respect to the interior temperature x are plotted. A gradient (changing rate) for the interior temperature is defined as a. The airflow is arranged to be included within the level 1 to the level 31. Therefore, even if the gradient a is changed within the following range shown by Eq. (25), the discontinuity of the airflow can be restrained at most within 1 level.

$$\frac{(31-1)-1}{31-1} \times a \leq a \leq \frac{(31-1)+1}{31-1} \times a \qquad (25)$$

For example, when the interior temperatures $x_1$, $x_2$ are respectively set to 30° C., 40° C., the gradient a of a line of the least square solutions is a=(31−1)/(40−30)=3. Therefore, a tolerance discontinuity range is 2.9≦a≦3.1. A line 1 and a line 2 in FIG. 22 respectively correspond to lines whose gradients are 2.9 and 3.1. According to the line 1, the airflow discontinuity against the least square solutions becomes maximum when the interior temperature is 40° C., and the estimated value of the airflow discontinuity is 1 level. According to the line 2, the airflow discontinuity against the least square solutions becomes maximum when the interior temperature is 39.7° C., and the estimated value of the airflow discontinuity is less than 1 level. Hence, the airflow discontinuity is restricted at most within 1 level in any case. Therefore, when the least square solutions are within a range of between 2.9 and 3.1, the solutions can be calculated with practically sufficient accuracy even if the gradient a is replaced with a typical value such as 2.9 or 3.1.

Furthermore, since the maximum value and the minimum value of the changing rate of the airflow with respect to each of the input signals are decided in the airflow control, it is restricted to set a control characteristic beyond the decided changing rate.

Next, one example of the airflow control will be explained hereinafter. Here, the range of the changing rates with respect to the interior temperature, the amount of sunlight, and the outside air temperature are assumed as follows.

TABLE 1

| | RANGE OF CHANGING RATE |
|---|---|
| INTERIOR TEMP. | [1.9, 6.0] (level/° C.) |
| AMOUNT OF SUNLIGHT | [0.013, 0.034] (level/(W/in²)) |
| OUTSIDE AIR TEMP. | [0.27, 1.7] (level/° C.) |

The table 1 shows that: the levels of the airflow increases from 1.9 to 6.0 as the interior temperature increases every 1° C.; the levels of the airflow increases from 0.013 to 0.034 as the amount of sunlight increases every 1 W/m²; and the level of the airflow increases from 0.27 to 1.7 as the interior temperature increases every 1° C.

It can limit a variable range of one of or all of the plane coefficients $a^j_k$, $b^j_k$, $c^j_k$, $d^j_k$ in Eq. (7), by using a characteristic that each changing rate with respect to each of the input is limited as in the table 1. When some plane coefficients beyond this range are set, the control might be unstable or comfortableness is lost. For example, variable ranges of the coefficients on which the flat plane 11 in FIG. 7 can take are shown as follows. That is, $1.9 \leq a^j_k \leq 6$ (level/° C.); $0.013 \leq b^j_k \leq 0.034$ (level/(W/m²)); $0.27 \leq c^j_k \leq 1.7$ (level/° C.).

The above-described ranges of the variable ranges of the coefficients show that: the levels of the airflow increases from 1.9 to 6.0 as the interior temperature increases every 1° C.; the levels of the airflow increases from 0.013 to 0.034 as the amount of sunlight increases every 1 W/m²; and the level of the airflow increases from 0.27 to 1.7 as the interior temperature increases every 1° C.

The typical value search technique can provide another method to calculate the least square solutions from Eq. (7) by employing a combination search instead of the singular value decomposition, in the case where the coefficients of the equations for flat planes can be replaced with discrete typical value like the airflow control described the above and further the variable ranges of each of the coefficients is decided. As described the above, the typical value search technique can realize by using the fixed-point CPU because it does not need the floating-point arithmetic and it can decrease an amount of calculations.

The calculation step of the typical value search technique will be explained in detail hereinafter.

To solve the least square solutions from Eq. (7) is equivalent to solve the coefficients $a^j_k$, $b^j_k$, $c^j_k$, $d^j_k$ to which the following Eq. (26) becomes minimum.

$$F(a^j_k, b^j_k, c^j_k, d^j_k) = \sum_{i=1}^{k}((a^j_k x_i + b^j_k y_i + c^j_k z_i + d^j_k) - w_i)^2 \qquad (26)$$

Here, since F takes on its minimum value, the following relationship as shown by Eq. (27) is established.

$$\frac{\partial F}{\partial d^j_k} = 2\sum_{i=1}^{k}((a^j_k x_i + b^j_k y_i + c^j_k z_i + d^j_k) - w_i) = 0 \qquad (27)$$

Eq. (27) can be simplified as the following Eq. (28).

$$d^j_k = \bar{w} - (a^j_k \bar{x} + b^j_k \bar{y} + c^j_k \bar{z}) \qquad (28)$$

Here, $\bar{w}, \ldots, \bar{z}$ respectively indicate an average value of each of the components of the teacher data, and shown as the following Eq. (29).

$$\bar{w} = \frac{1}{k}\sum_{i=1}^{k}w_i,\ \bar{x} = \frac{1}{k}\sum_{i=1}^{k}x_i,\ \bar{y} = \frac{1}{k}\sum_{i=1}^{k}y_i,\ \bar{z} = \frac{1}{k}\sum_{i=1}^{k}z_i \qquad (29)$$

Therefore, when the coefficients $a^j_k$, $b^j_k$, $c^j_k$ are decided, the coefficient $d^j_k$ can be calculated by using Eq. (28). Here, the following Eq. (30) is derived by replacing Eq. (28) into Eq. (26).

$$F(a^j_k, b^j_k, c^j_k) = \sum_{i=1}^{k}((a^j_k X_i + b^j_k Y_i + c^j_k Z_i) - W_i)^2 \qquad (30)$$

Here, W, ..., Z respectively indicate values, in which the average value of each of the components of the teacher data is subtracted from each of the components of the teacher data, and are shown as the following Eq. (31).

$$X_i = x_i - \bar{x},\ Y_i = y_i - \bar{y},\ Z_i = z_i - \bar{z},\ W_i = w_i - \bar{w} \qquad (31)$$

Next, a method of decision of the coefficients $a^j_k$, $b^j_k$, $c^j_k$ will be explained. In this embodiment, finite numbers of the typical values are provided to every coefficient. The number of each of the coefficients is assumed to Np, Nq, Nr; and each typical value is described as follows.

$$\begin{cases} \text{Typical Value of } a_k^j & \hat{a}_1, \hat{a}_2, \ldots, \hat{a}_{Np} \\ \text{Typical Value of } b_k^j & \hat{b}_1, \hat{b}_2, \ldots, \hat{b}_{Nq} \\ \text{Typical Value of } c_k^j & \hat{c}_1, \hat{c}_2, \ldots, \hat{c}_{Nr} \end{cases} \quad (32)$$

Here, the typical values of the $a^j_k$ are set so that: $\hat{a}_1 < \hat{a}_2 < \ldots < \hat{a}_{Np}$; $\hat{a}_1$ is equal or larger than the minimum value of the variable range of the coefficient $a^j_k$; and $\hat{a}_{Np}$ is equal or smaller than the maximum value of the variable range of the coefficient $a^j_k$. Similar relationships are set to the typical values of the $b^j_k$ and $c^j_k$. The number of the typical values is adequately decided in view of a calculation accuracy of the least square solutions required to the system.

The calculation accuracy increases as the number of the least square solutions increases. The following table2 shows an example of the number and the least square solutions suitable for the airflow control, which are decided based on the variable ranges of each of the coefficients.

TABLE 2

| | NUMBER | TYPICAL VALUES | | | | | | |
|---|---|---|---|---|---|---|---|---|
| $a_k^j$ | 19 | 1.900 | 2.048 | 2.185 | 2.330 | 2.486 | 2.651 | 2.828 |
| | | 3.016 | 3.218 | 3.432 | 3.661 | 3.905 | 4.165 | 4.443 |
| | | 4.739 | 5.055 | 5.392 | 5.752 | 6.000 | | |
| $b_k^j$ | 4 | 0.013 | 0.0199 | 0.0268 | 0.0340 | | | |
| $c_k^j$ | 4 | 0.270 | 0.758 | 1.249 | 1.700 | | | |

When the typical values are used as the coefficients $a^j_k$, $b^j_k$, $c^j_k$, the number of combinations is represented by $Np \times Nq \times Nr$. Part of or all of the combination of the $a^j_k$, $b^j_k$, $c^j_k$ are replaced into Eq. (30) to calculate the value of F. A specific combination which minimize the value of F is determined as the solutions. When the combination is described as $(a_k^j, b_k^j, c_k^j) = (\hat{a}_p, \hat{b}_q, \hat{c}_r)$, the coefficient $d^k$ can be calculated by Eq. (28) and the following Eq (33).

$$d_k^j = \bar{w} - (\hat{a}_p \bar{x} + \hat{b}_q \bar{y} + \hat{c}_r \bar{z}) \quad (33)$$

Note that when there are plural of combinations, which minimize F, specific combination, which minimizes the following Eq. (34), is selected. This Eq. (34) is a simplified equation of Eq. (10) or Eq. (12).

$$(a_k^j - a_{k-1}^j)^2 + (b_k^j - b_{k-1}^j)^2 + (c_k^j - c_{k-1}^j)^2 \quad (34)$$

Next, a method for reducing amount of calculations of the combination search by reforming Eq. (30) will be explained hereinafter. When the coefficients $b^j_k$, $c^j_k$ are given, Eq. (35) can be calculated.

$$R_i = b_k^j Y_i + c_k^j Z_i - W_i \quad (35)$$

Therefore, Eq. (30) can be reformed as follows.

$$E(a_k^j, b_k^j, c_k^j) = \sum_{i=1}^{k}(a_k^j X_i + R_i)^2 \quad (36)$$

$$= (a_k^j)^2 \sum_{i=1}^{k} X_i^2 + 2a_k^j \sum_{i=1}^{k} R_i X_i + \sum_{i=1}^{k} R_i^2$$

$$= a_k^j \left( a_k^j \sum_{i=1}^{k} X_i^2 + 2 \sum_{i=1}^{k} R_i X_i \right) + \sum_{i=1}^{k} R_i^2$$

When $S_{XX}$, $S_{RX}$, $S_{RR}$ are defined as $$S_{XX} = \sum_{i=1}^{k} X_i^2,$$

$$S_{RX} = 2\sum_{i=1}^{k} R_i X_i,$$

$$S_{RR} = \sum_{i=1}^{k} R_i^2,$$

the following Eq. (37) is obtained. A calculation algorithm described later will use this Eq. (37).

$$F(a_k^j, b_k^j, c_k^j) = a_k^j(a_k^j S_{XX} + S_{RX}) + S_{RR} \quad (37)$$

To summarize, the above-described method can be shown as the following algorithm.

[Step A1] Calculate averages of each component of the teacher data.

$$\bar{x} \leftarrow \frac{1}{k}\sum_{i=1}^{k} x_i, \ \bar{y} \leftarrow \frac{1}{k}\sum_{i=1}^{k} y_i, \ \bar{z} \leftarrow \frac{1}{k}\sum_{i=1}^{k} z_i, \ \bar{w} \leftarrow \frac{1}{k}\sum_{i=1}^{k} w_i$$

[Step A2] Transform each component of the teacher data.

$$X_i \leftarrow x_i - \bar{x}, \ Y_i \leftarrow y_i - \bar{y}, \ Z_i \leftarrow z_i - \bar{z}, \ W_i \leftarrow w_i - \bar{w}$$

[Step A3] Calculate as follows.

$$S_{XX} \leftarrow \sum_{i=1}^{k} X_i * X_i$$

[Step A4] Repeat the following step B for $r = 1, 2, \ldots, N_r$.

[Step B] Repeat the following steps C1, C2, C3 for $q = 1, 2, \ldots, N_q$.

[Step C1] Set $S_{RX} \leftarrow 0$, $S_{RR} \leftarrow 0$.

[Step C2] Repeat the following step for $i = 1, 2, \ldots, k$.

$$R_i \leftarrow \hat{b}_q Y_i + \hat{c}_r Z_i - W_i$$

$$S_{RX} \leftarrow S_{RX} + R_i * X_i$$

$$S_{RR} \leftarrow S_{RX} + R_i * R_i$$

[Step C3] Calculate as follows.

$$S_{RX} \leftarrow S_{RX} * 2$$

[Step C4] Repeat the following calculations for $q = 1, 2, \ldots, N_p$.

$$F(\hat{a}_p, \hat{b}_q, \hat{c}_r) \leftarrow \hat{a}_p * S_{XX} + S_{RX}$$

$$F(\hat{a}_p, \hat{b}_q, \hat{c}_r) \leftarrow \hat{a}_p * F + S_{RR}$$

[Step A5] Calculate coefficient d by using the coefficients $(\hat{a}_p, \hat{b}_q, \hat{c}_r)$, which give minimum value of F in steps C1 to C4. Note that when there are plural of combinations, which minimize F, specific combination, which minimizes the following Eq. (38), is selected.

$$(\hat{a}_p - a_{k-1}^j)^2 + (\hat{b}_q - b_{k-1}^j)^2 + (\hat{c}_r - c_{k-1}^j)^2 \quad (38)$$

[Step A6] Determine coefficient d by the following Eq. (39).

$$d \leftarrow \bar{w} - (\hat{a}_p\bar{x} + \hat{b}_q\bar{y} + \hat{c}_r\bar{z}) \quad (39)$$

(End of algorithm)

Here, when $S_{XX}>0$, Eq. (37) is a function (curve) of the second order of the coefficient $a^j_k$ shown by a parabola having only one minimum value. A calculation speed can be facilitated by omitting one of the calculations of the step C3 using a conventional technique using this characteristic. For example, when the number m, in which m>1 and $F(\hat{a}_{m-1}, \hat{b}_q, \hat{c}_r) < F(\hat{a}_m, \hat{b}_q, \hat{c}_r)$ are satisfied, are found, the calculations can be omitted because the $F(\hat{a}_p, \hat{b}_q, \hat{c}_r)$ will not take on the minimum value for the later p=m+1, m+2, . . . , $N_p$.

As described the above, in this embodiment, it is not necessary to exactly calculate the solutions of the simultaneous equations Eq. (7); and it can calculate by the low-speed fixed-point arithmetic because the least square solutions can be calculated by providing the finite number of the typical values to every coefficient and by resulting in a combination search problem of the typical values, in the case where the each of the variable range of every coefficients is previously decided. Furthermore, since the calculation can be partly omitted as described the above, the calculation can be achieved even by the low-speed fixed-point CPU used for vehicles.

Note that there are some countermeasures to result the decision of the adequate control parameter in the simultaneous equations like Eq. (7), for example, an adaptive filter. Furthermore, the variable range of the control parameter is restricted as in the table 1 in order to secure a stability of control in an actual control. Therefore, the control parameter can be decided by providing adequate typical values within the range and by performing the combination search of the typical values. In this way, the present invention is not limited to the airflow control of the vehicular air-conditioning system, but is widely applicable to the other system.

Next, a commonality of the boundaries between adjacent flat planes by using the typical value search technique will be explained hereinafter. This technique does not search all combinations of the typical values, but searches one of the combinations with limiting certain range. This technique will be explained in detail by applying the airflow control, for example.

Figure 23:
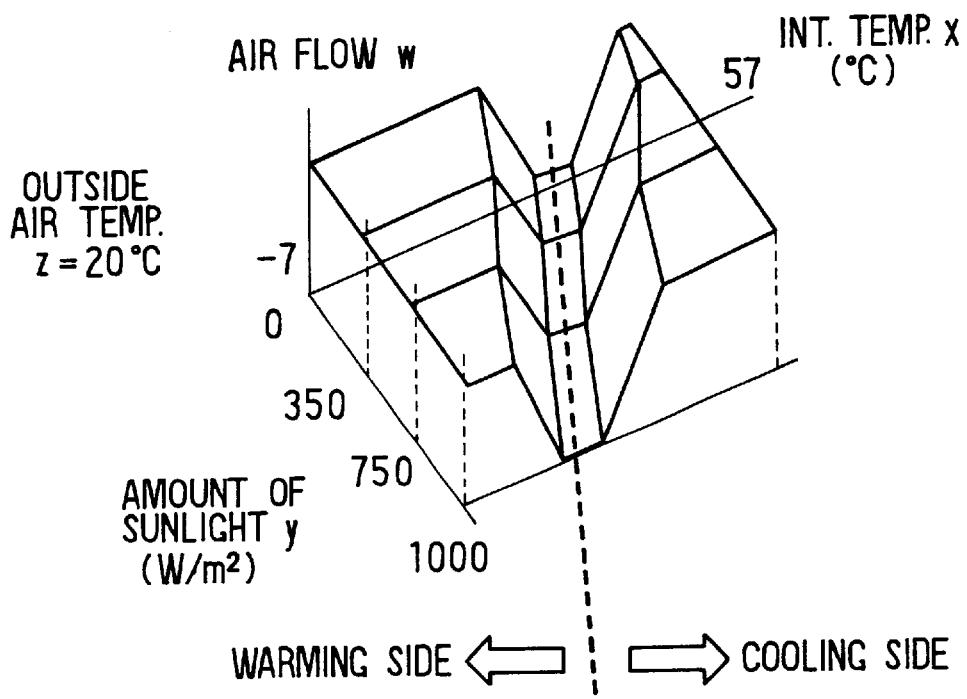
FIG. 23 is a diagram illustrating flat planes representing airflow control characteristic where outside air temperature is at 20° C.

FIG. 23 shows a diagram illustrating surfaces representing airflow control characteristics where the outside air temperature is 20° C., with respect to the interior temperature and the amount of sunlight. This diagram has a V-shaped valley-shape. Left side with respect to the valley shows a warming side (warming control characteristic) and right side with respect to the valley shows a cooling side (cooling control characteristic). In this diagram, the amount of sunlight is divided to the following three zones: [0, 350] W/m²; [350, 750] W/m²; [750, 1000] W/m².

Figure 24:
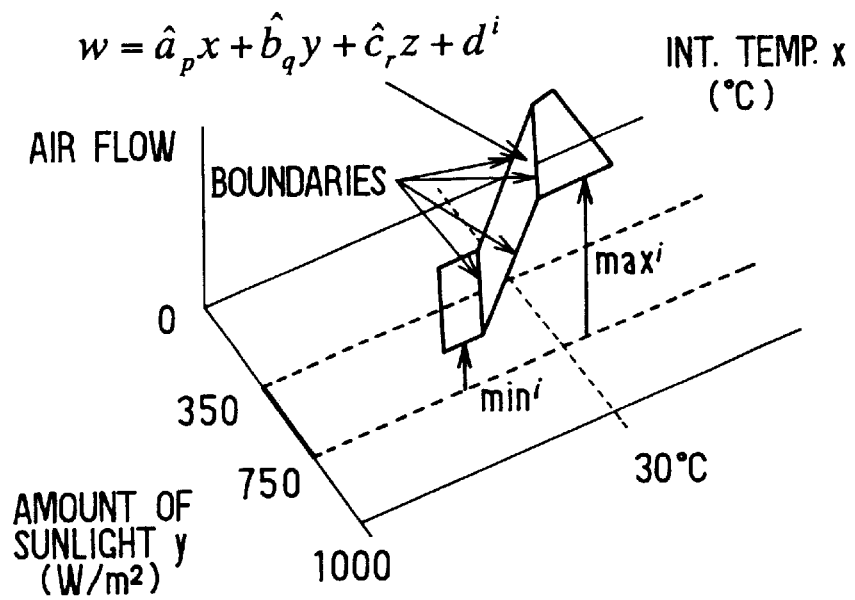
FIG. 24 is a diagram illustrating flat planes representing boundaries between slant flat surface and a maximum value, and a minimum value.

Here, FIG. 24 shows the cooling control characteristic within the zone of [350, 750] W/m². This can be obtained by clipping a slant flat plane $w=\hat{a}_p x+\hat{b}_q y+\hat{c}_r z+d^i$ with a maximum airflow max$^i$ and a maximum airflow min$^i$. In this diagram, there are four boundaries. Here, as shown in FIG. 24, two boundaries at which the slant flat plane connects with the maximum value and the minimum value are considered at first. Here, it assumes that the equation representing the slant flat plane $w=\hat{a}_p x+\hat{b}_q y+\hat{c}_r z+d^i$ is updated to a slant flat plane $w=\hat{a}_p x+\hat{b}_q y+\hat{c}_r z+d^{i'}$ as a result of adding the additional teacher data and of performing the typical value search technique. The boundaries where the slant flat plane connects the maximum value and the minimum value are moved as. a result of updating, however, there is no problem because the slant flat plane connects with the maximum value or the minimum value at the one of the boundaries.

Figure 25A:
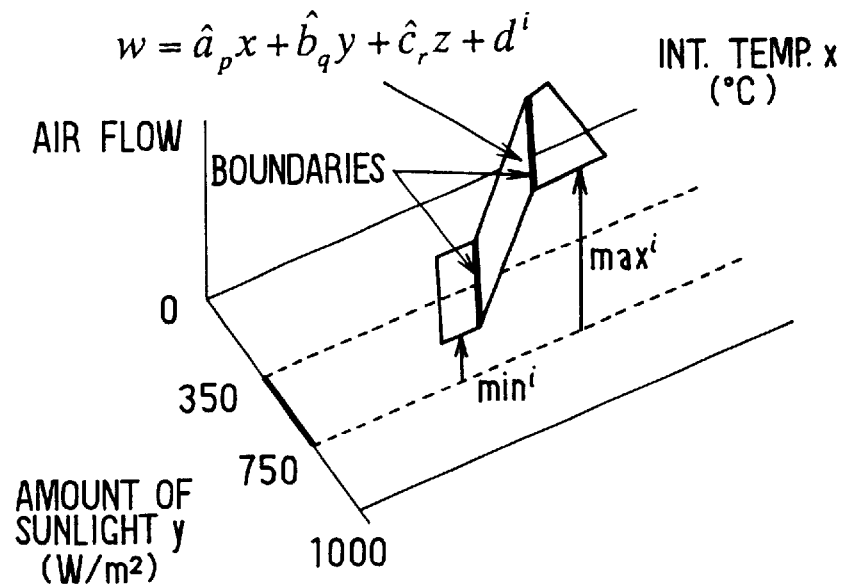
FIGS. 25A and 25B are diagrams illustrating flat planes representing movements of the boundaries at the maximum value and the minimum value.
Figure 25B:
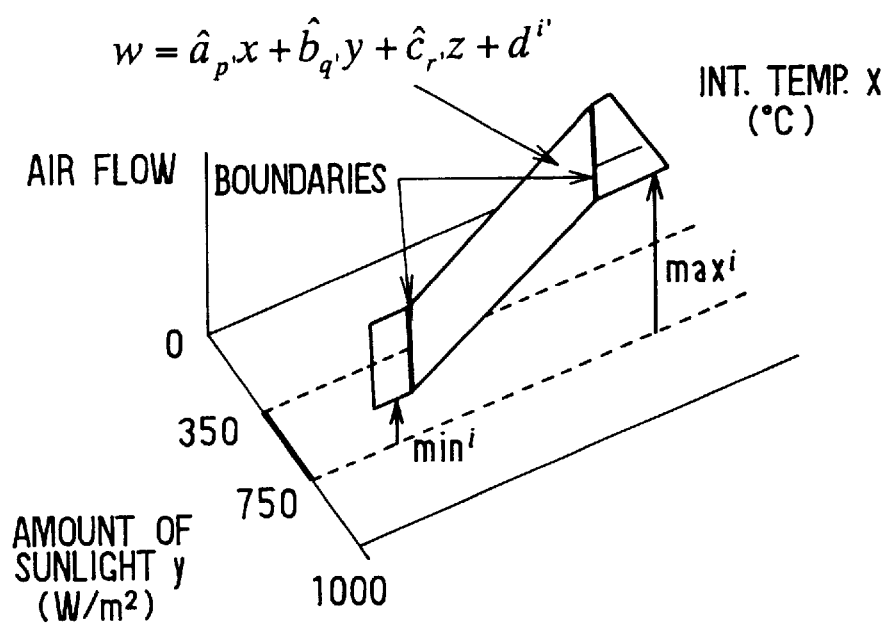

FIGS. 25A and 25B show the slant flat planes before and after updating, respectively. In both cases, the flat planes connect the maximum value and minimum value with common boundaries. That is, there are no discontinuities between the slant flat planes and horizontal flat planes representing the maximum value and minimum value.

Figure 26A:
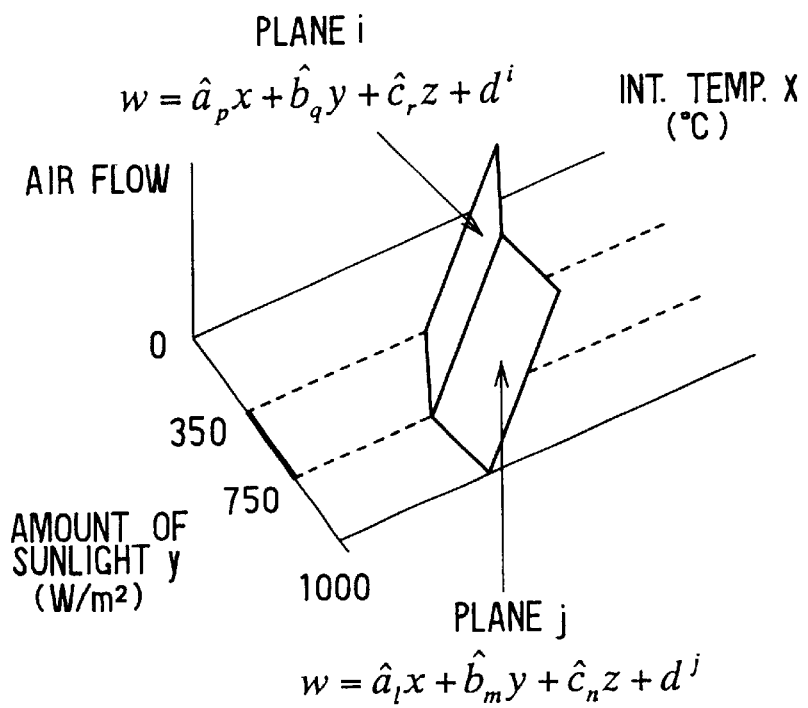
FIGS. 26A and 26B are diagrams illustrating flat planes representing discontinuity of the boundaries of the slant flat planes.
Figure 26B:
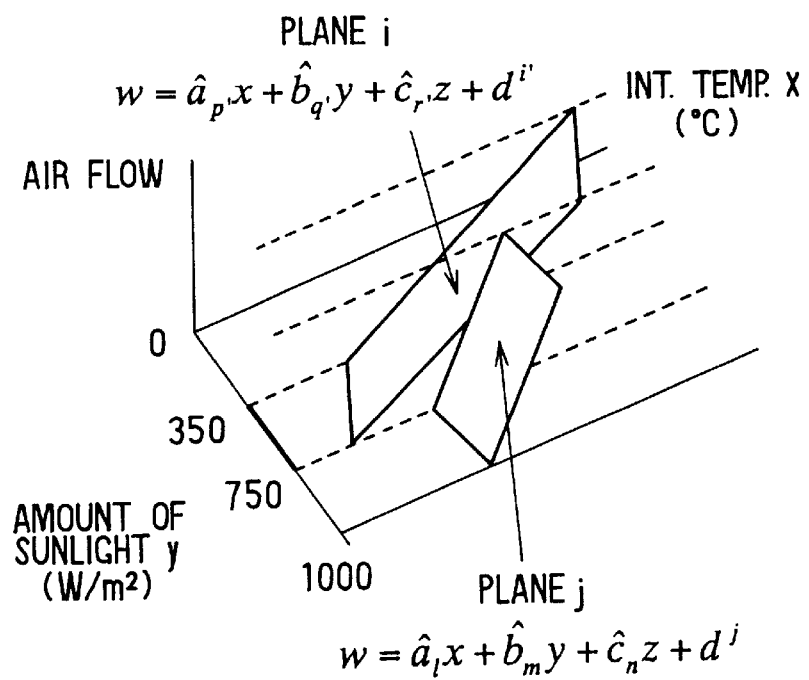

Next, the boundaries at which the slant flat plane connects with another slant flat plane will be considered. As shown in FIGS. 26A, 26B, it assumes that one slant flat plane at the zone of [350, 750] W/m² (hereinafter, called "slant flat plane i") and another slant flat plane at the zone of [750, 1000] W/m² (hereinafter, called "slant flat plane j") are connected with each other, as shown in FIG. 26A, 26B. As shown in FIG. 26A, of the boundaries between the slant flat planes are common before learning. However, after the learning. the boundaries of the both slant flat planes are shifted as a result of changing the gradient of the slant flat plane i due to the learning. Therefore, it needs to update the equation of the slant flat plane j so that the boundaries become common again.

Note that it is not necessary for both boundaries of the two slant flat plane to completely accord with each other. The user or driver would not feel incongruity for the airflow control even when the difference by 1–2 levels of airflow are caused at the boundaries. Hereinafter, "a commonality of the boundaries between adjacent flat planes" means that the difference of airflow caused at the boundaries of the both slant flat plane are reduced to a predetermined range in which the user or driver would not feel incongruity for the airflow control.

Figure 27A:
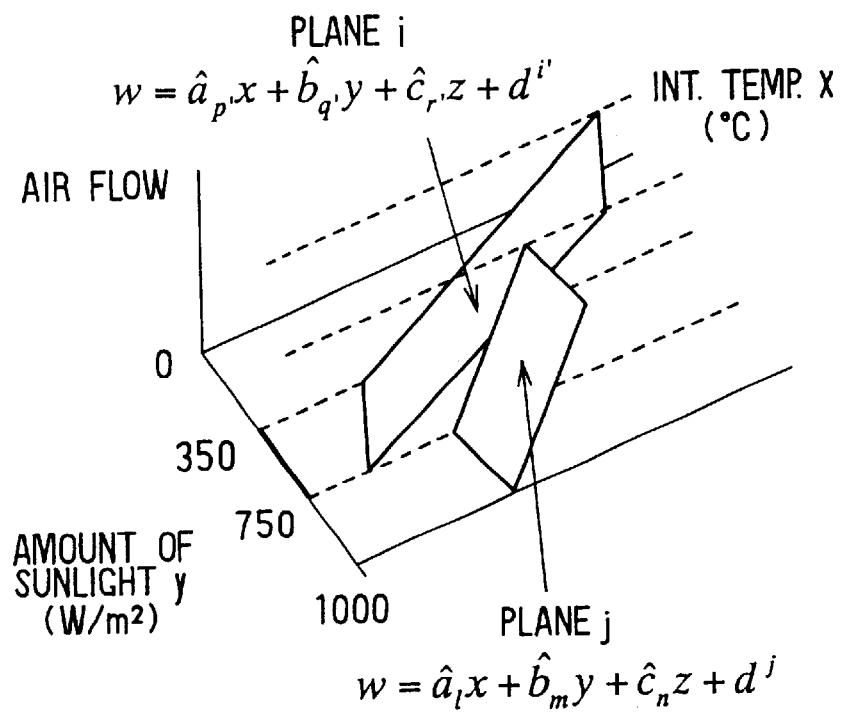
FIGS. 27A and 27B are diagrams illustrating flat planes representing correction of the discontinuity of the boundaries of the slant flat planes.
Figure 27B:
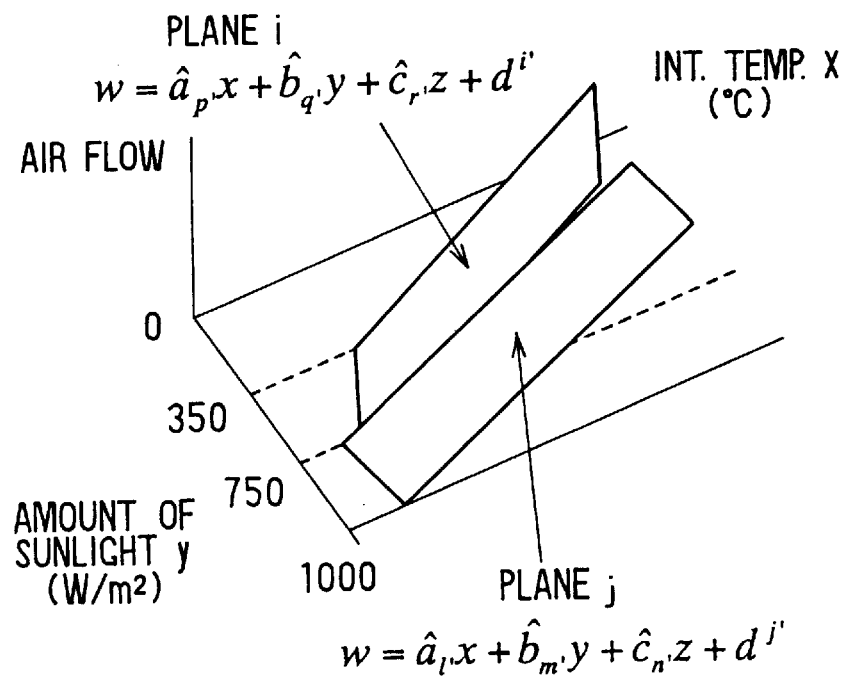

An update method of the equations of the adjacent slant flat plane of this embodiment will be explained with reference to FIGS. 27A, 27B. At first, it assumes that the equation of the slant flat plane i is updated to $w=\hat{a}_p x+\hat{b}_q y+\hat{c}_r z+d^{i'}$. Here, the equation of the adjacent slant flat plane j is updated from $w=\hat{a}_l x+\hat{b}_m y+\hat{c}hd nz+d^j$ to $w=\hat{a}_{l'} x+\hat{b}_{m'} y+\hat{c}_{n'} z+d^{j'}$ so that the boundaries become common, as shown in FIG. 27B. From a viewpoint of human temperature sense, it is preferable to smoothly change the control characteristic between the adjacent slant flat planes and it is not preferable to abruptly change the control characteristic at the boundary between the adjacent slant flat planes. This situation corresponds to that the coefficients of the slant flat planes are not substantially changed between the adjacent slant flat planes. For example, when the gradient of the slant flat plane i for the interior temperature x is $\hat{a}_{p'}$, it needs to determine the gradient $\hat{a}_{l'}$ of the slant flat plane j for the interior temperature x to or near $\hat{a}_{p'}$. In other words, the typical values of the $\hat{a}_{l'}$ is not selectable from all of $\hat{a}_1<\hat{a}_2< \ldots <\hat{a}_{Np}$, but is restricted by 2α+1 value ($\hat{a}_{p'-\alpha}, \ldots, \hat{a}_{p'}, \ldots, \hat{a}_{p'+\alpha}$), where α is a natural number. FIG. 22 shows a diagram illustrating the range of the selectable typical values of $\hat{a}_{l'}$. Similarly, the coefficient $\hat{b}_{m'}$ is restricted by 2β+1 value ($\hat{b}_{q'-\beta}, \hat{b}_{q'}, \hat{b}_{q'+\beta}$); and the coefficient $\hat{c}_{n'}$ is restricted by 2γ+value ($\hat{c}_{r'-\gamma}, \ldots, \hat{c}_{r'}, \ldots, \hat{c}_{r'+\gamma}$). In this case, the number of the selectable typical values is (2α+1)(2β+1)(2γ+1). Therefore, the typical values that minimize the Eq. (30) are selected from this (2α+1)(2β+1)(2γ+1) teacher data of the adjacent slant flat plane j to decide the equation $w=\hat{a}_{l'}x+\hat{b}_{m'}y+\hat{c}_{n'}z+d^{j'}$ of the adjacent slant flat plane j. In this way, the commonality of the boundaries can be achieved by restricting the range of selectable typical values of the adjacent slant flat plane j based on the typical value of the slant flat plane i and by restricting the abruptly change of the characteristics of adjacent slant flat planes.

Here, in the above-described embodiment, the selectable range of l' is explained as $p'-\alpha \leq l' \leq p'+\alpha$, however, the selectable range is not limited to this range. In more generally, the selectable range may be $p^L \leq l' < p^U$ by using two natural numbers $p^L$, $p^U$, which satisfy $1 \leq p^L \leq p' \leq p^U \leq N_p$. In this case, the number of the typical values is $p^L - p^U + 1$. Similar modifications are applicable to the coefficients b, c. commonality of the boundaries between adjacent flat planes Furthermore, it is not essential to perform the commonality of the boundaries between adjacent flat plane j at the same time as the coefficients of the slant flat plane i are updated by the learning. That is, it assumes that the interior temperature, the amount of sunlight, and the outside air temperature at time $t_0$ are (30° C., 700 W/m², 20° C.), respectively. At first, the slant flat plane i is used for the control. In this case, it assumes that the slant flat plane i is updated at the time $t_0$. When the interior temperature, the amount of sunlight, and the outside air temperature at time $t_0$ are changed to (30° C., 750 W/m², 20° C.) at time $t_1$ after the time $t_0$, the control is changed from the slant flat plane i to the slant flat plane j. The commonality of the boundaries may be performed at this timing, that is time $t_1$. In this way, it is enough to perform the commonality of the boundaries at the time when the control is changed to the one slant flat plane to the adjacent slant flat plane.

Figure 29A:
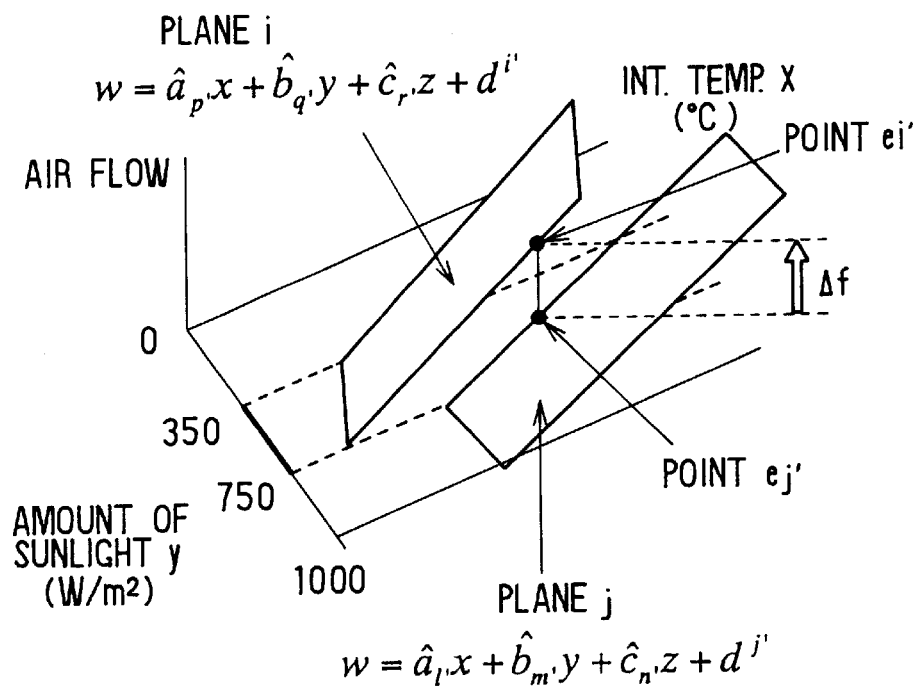
FIGS. 29A and 29B are diagrams illustrating parallel movement of the slant flat planes.

On the contrary, the boundaries may be shifted as shown in FIG. 29A depending on the teacher data registered in the slant flat plane j. Hereinafter, a countermeasure to prevent this situation will be explained.

When the interior temperature, the amount of sunlight, and the outside air temperature at the time the control is changed from the one slant flat plane to the adjacent slant flat plane are $x_B$, $y_B$, $z_B$, respectively, and when the airflow of the slant flat planes are $w_B^{i'}$, $w_B^{j'}$, the following Eq. (40) is established.

$$\begin{cases} w_B^{i'} = \hat{a}_{p'} x_B + \hat{b}_{q'} y_B + \hat{c}_{r'} z_B + d^{i'} \\ w_B^{j'} = \hat{a}_{l'} x_B + \hat{b}_{m'} y_B + \hat{c}_{n'} z_B + d^{j'} \end{cases} \quad (40)$$

Figure 29B:
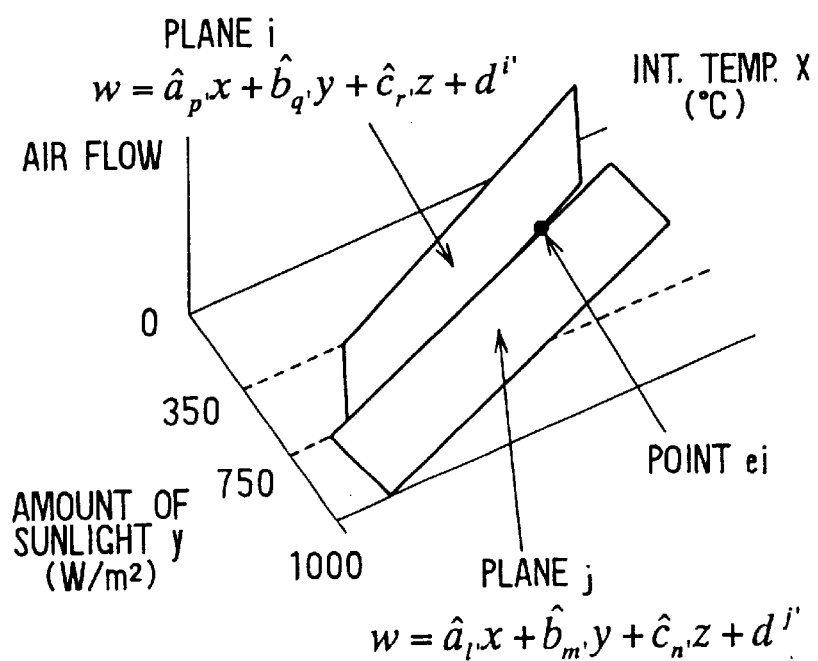

Here, points $e^{i'}$, $e^{j'}$, in FIG. 29A respectively represent specific points $(x_B, y_B, z_B, w_B^{i'})$ $(x_B, y_B, z_B, w_B^{j'})$ in four-dimensional space. A difference of the airflow between the slant flat planes i, j is represented by $\Delta f = w_B^{i'} - w_B^{j'}$. Next, the equations for flat planes is updated such that the flat planes pass through newest data items of the teacher data corresponding to a subject subspace. In other words, the coefficient $d^{j'}$ of the slant flat plane j is reset to $d^{j'} \leftarrow d^{j'} + \Delta f$ so as to shift the slant flat plane j in parallel so that both slant flat planes become continuous at the point $e^{i'}$ (see FIG. 29B). Thus, it can secure the continuousness of the control.

Next, the correction of discontinuity between an environmental condition of the teacher data at a start of input and an environmental condition of the teacher data at the end of input will be explained.

In the above-described embodiments, when the user changes the airflow to $w_k$ by a switch operation at time $t_0$, the environmental conditions including the interior temperature $x_k$, the amount of sunlight $y_k$, the outside air temperature $z_k$ are registered in the teacher data storage portion 15 as the teacher data, and the equation for the plane of subspace including the point $(x_k, y_k, z_k)$, Here, since an airflow switch can correct the airflow by only ±1 level or ± some levels in one operation, the user has to repeat the switch operation many times when the user corrects more than 10 levels. It takes from some seconds to some tens seconds for the user to complete the input. The environmental conditions may be changed even in such a short time. For example, the amount of sunlight is changed from 500 W/m² to 1000 W/m²₁ when the cloud covering the sun goes away, or when the vehicle moves from shadow area of a building to a sunny area. In such a situation, it needs to correct the environmental changes during the switch operation after updating the equation for the flat plane.

Here, it assumes that the user starts to operate at time $t_0$ and completes it at time $t_1$, that the airflow is changed from $w_0$ to $w_1$, and that the environmental condition is changed from $(x^0, y^0, z^0)$ to $(x^1, y^1, z^1)$, respectively.

In this embodiment, this system operates in a normal operation mode, and moves to a learning mode at the time $t_0$ at which the user starts to operate. Furthermore, the system registers the teacher data $(x_0, y_0, z_0, w_1)$ in a subspace where the environmental condition $(x_0, y_0, z_0)$ belongs at the time $t_1$ at which the user completes to operate (Note that the environmental condition of the teacher data is obtained at the time $t_0$, and the airflow is obtained at the time $t_1$). After updating the equation for the flat plane by solving Eq. (7), the system returns to the operation mode. At the operation mode, the system restarts a control by using the updated airflow control characteristic. Note that, during the learning mode, the system holds the airflow inputted by the switch operation and does not automatically change the airflow even if the environmental condition changes.

At first, it assumes that the interior temperature is changes from 30° C. to 28° C. during the user changes the airflow from level 25 to level 15 by the switch operation, and that the amount of sunlight and the outside air temperature are 500 W/m² and 20° C., respectively. The flat plane corresponding this environmental condition is a slant flat plane at a zone of the amount of sunlight [350, 750] 500 W/m² shown in FIG. 24.

Figure 30A:
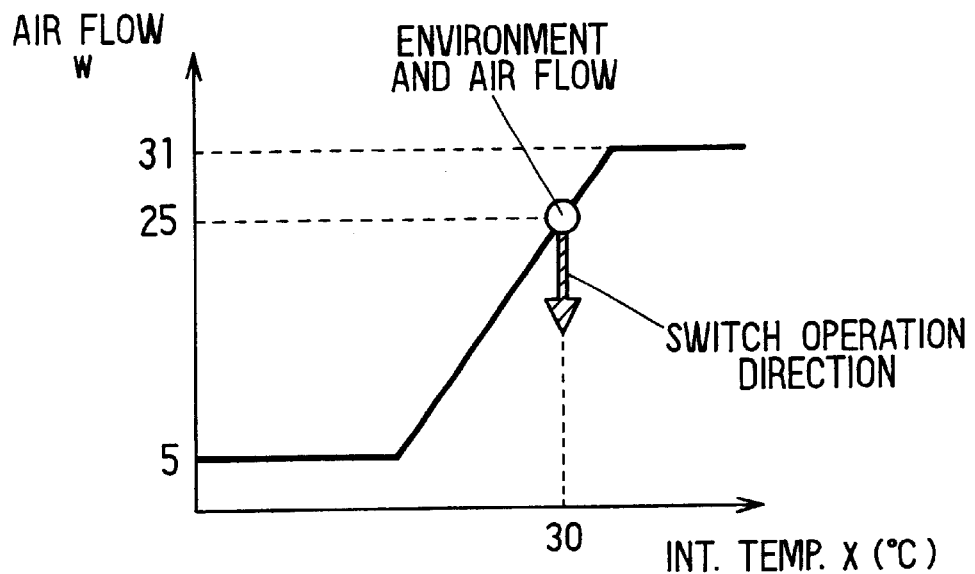
FIGS. 30A and 30B are diagrams illustrating difference of environmental condition between switch operations.
Figure 30B:
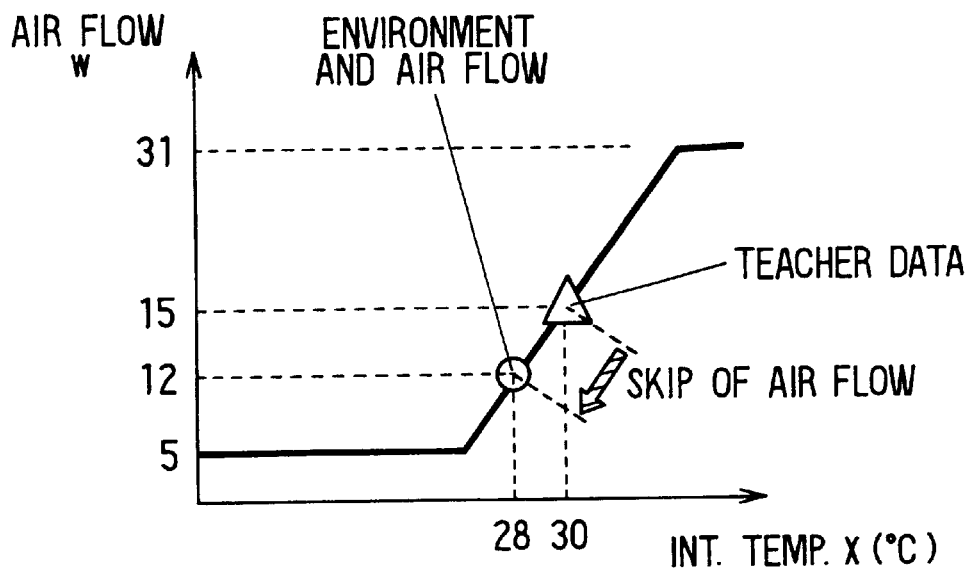

FIGS. 30A, 30B show graphs of the airflow control characteristics with respect to the interior temperature. FIG. 30A shows a condition at the time to in which the environmental condition and the airflow (x, y, z, w)=(30° C., 500 W/m², 20° C., level 25). FIG. 30B shows a condition just after the updating the airflow control characteristic so as to satisfy the teacher data (30° C., 500 W/m², 20° C., level 15) by the learning, after completing the switch operation at the time t1. However, since the interior temperature has changed to 28° C., as shown in FIG. 30B, the airflow skips to level 12 when the system returns to the operation mode. In other words, the airflow is discontinuously skipped to level 12 at the point when the learning is completed, despite the user inputted (or designated) level 15 by the switch operation.

Figure 31A:
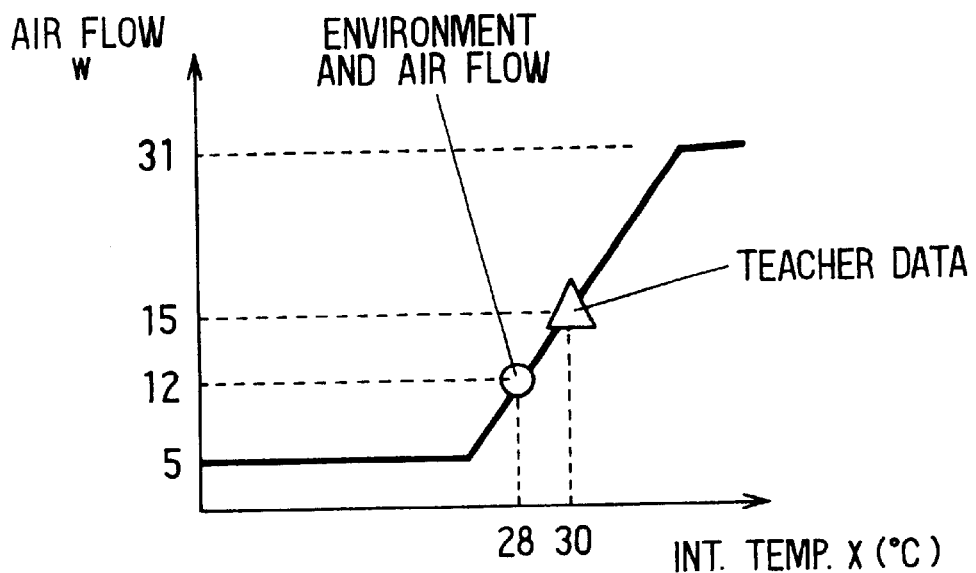
FIGS. 31A and 31B are diagrams illustrating correction of the difference of the environmental condition between switch operations.
Figure 31B:
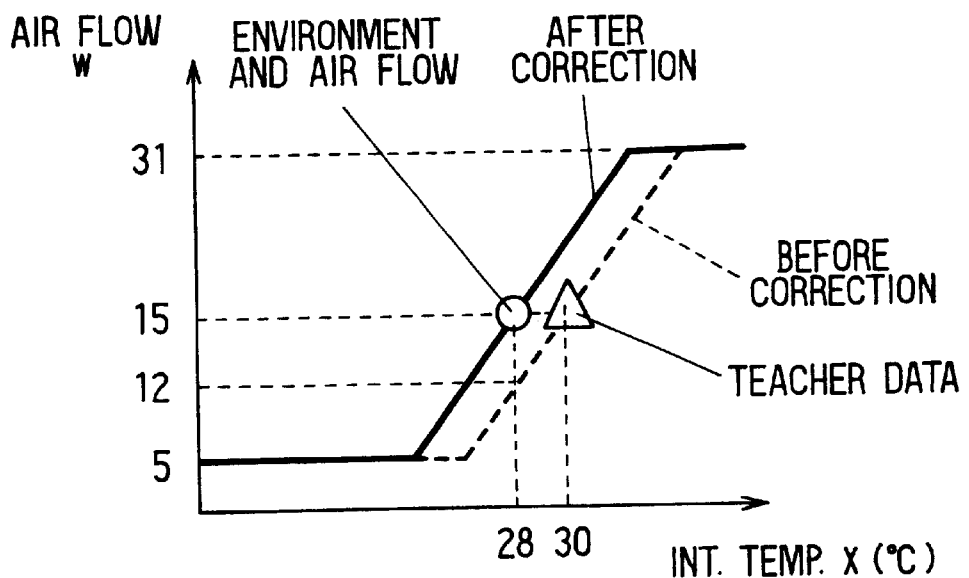

In order to such an inconvenience, the following embodiment moves the control characteristic in parallel after completing the learning so that the airflow becomes level 15 designated by the user even in a environmental condition (x, y, z)=(28° C., 500 W/m², 20° C.) of after learning as shown in FIGS. 31A, 31B. Thus, the skip of the airflow at the time when the learning is completed can be prevented.

The above-described embodiment is an example in which the environmental conditions $(x^0, y^0, z^0)$, $(x^1, y^1, z^1)$ at times $t_0$, $t_1$ belong the same subspace. However, in the case where the both of them belong different subspaces, a prevention of the skip of the airflow is performed after correcting the shift of the adjacent flat plane show in FIGS. 27A, 27B.

Here, it assumes that the amount of sunlight is increased from 500 W/m² to 900 W/m² during the switch operation. In this case, the environmental conditions at the time $t_0$, $t_1$ respectively belong the zone of the amount of sunlight [350, 750] W/m², [750, 1000] W/m². At the time t1, the system performs the learning of the zone of the amount of sunlight [350, 750] W/m² by adding the teacher data (x, y, z, w)=(30° C., 500 W/m², 20° C., level 15). The updated equation for the flat plane is $w=\hat{a}_p x + \hat{b}_{q'} y + \hat{c}_{r'} z + d^{i'}$ as shown in FIG. 27A. Since the environmental condition is jumped to (x, y, z)= (30° C., 900 W/m², 20° C.), the system moves its control to the flat plane of the zone of the amount of sunlight[750, 1000]W/m². Therefore, the system updates the equation to $w=\hat{a}_p x + \hat{b}_m y + \hat{c}_n z + d^{i'}$, as shown in FIG. 27B, so that the boundaries of the flat planes become common. After that, the value of $d^{i'}$ may be corrected so as to satisfy (x, y, z, w)=(30° C., 900 W/m², 20° C., level 15).

According to experimental results, in the case where the above-described method, in which the discontinuity between the environmental condition at the start of input and the environmental condition at the end of input is corrected, is not applied, the airflow is frequently jumped (skipped) when the system returns from the learning mode to the operation mode. Hence the user has to repeat the input operation of the airflow because the airflow was not changed. to the inputted value. On the contrary, in the case where the above-described method is applied, the airflow can be easily accord with the inputted value.

While the preferred embodiments of the present invention have been described in detail, the present invention is not restricted thereto, as various changes and modifications are possible within the scope of the invention.

For example, in the above embodiments, the present invention has been applied to vehicular air-conditioning systems. However, the invention can be applied to apparatuses in which control is provided using maps or the like. Examples include engine control and cruise control systems. In an automotive cruise control system, driving patterns of skilled drivers can be built into maps, and vehicle operation controlled according to the maps. As a large number of steps are typically necessary to design such maps, the present invention can reduce the number of design steps by causing driving patterns of skilled drivers to be learned by control characteristics approximation and learning algorithms using an assemblage of flat planes. Hence, the designing of the control characteristics of plane models is automated, and the number of design steps can be reduced.

The variable-calculating apparatus can also be embodied as an air conditioner in which the airflow or the temperature at the outlet is calculated in an air-conditioning process. That is, this air conditioner uses the outside air temperature entered from a sensor, the interior temperature, and the amount of sunlight as input variables. Other input variables may also be used. The airflow or the exit of the air distribution duct is calculated as a controlled variable. The air conditioner is equipped with a device for driving the air-conditioner unit according to the airflow or the temperature at the exit of the air distribution duct. It is to be noted that no restrictions are imposed on the input variables. If the air conditioner is installed in a vehicle, the temperature of the water in the radiator may be used as an additional input variable.

The database 13 and updating portion 14 of the present invention can be realized by a computer system. For example, the corresponding necessary functions can be implemented by a program activated by the computer system. Preferably, the program is stored on a floppy disk, a magneto-optic disk, a CD-ROM, a hard disk, or other recording medium that can be read by the computer system. If necessary, the program can be loaded into the computer system and activated. Otherwise, a ROM or a backup RAM may be used as a recording medium read by the computer system, with the program being stored thereon. The ROM or backup RAM may be incorporated into the computer system.

What is claimed is:

1. A controlled variable-calculating apparatus for calculating a controlled variable from n input variables (n being a natural number), comprising:

means for creating an n-dimensional input space including an assemblage of points corresponding to said n input variables, for dividing said n-dimensional input space into plural subspaces, and for defining equations for said subspaces, respectively;

flat plane storage means for storing equations for flat planes at which one unknown can be calculated from said n input variables; and controlled variable-calculating means for, when said input variables are applied, selecting an equation for a flat plane corresponding to a subspace including points corresponding to said input variables, and for calculating said one unknown from said input variables using said selected equation.

2. The apparatus of claim 1, further comprising:

controlled variable modification means permitting external modification of said controlled variable;

teacher data storage means adapted to store teacher data including the modified controlled variable and input variables entered during modification, said teacher data corresponding to a subspace corresponding to said input variables, said subspace being taken as a subject subspace; and learning control means for, when said controlled variable is entered via said controlled variable modification means, storing said teacher data in said teacher data storage means and updating the equations for flat planes stored in said plane equation storage means corresponding to said subject subspace according to the teacher data corresponding to said subject subspace of said stored teacher data.

3. The apparatus of claim 2, wherein said learning control means is for updating equations for plate planes such that boundaries between adjacent flat planes become common, as well as for updating the equations for flat planes corresponding to said subject subspace.

4. The apparatus of claim 2, wherein said learning control means is further for updating the boundaries of said corresponding subspace while updating said equations for flat planes.

5. The apparatus of claim 2, wherein said equations for flat planes are given by $$w = ax + by + \ldots + cz + d$$

where x, y, ..., z are n input variables, and w is a controlled variable;

said flat plane equation storage means stores plane coefficients a, b, ..., c, d; and said learning control means updates said equations for flat planes by updating said plane coefficients a, b, ..., c, d.

6. The apparatus of claim 5, wherein said learning control means is for finding plane coefficients $a_k, b_k, \ldots, c_k, d_k$ as solutions of a simultaneous equation (101) given below according to the teacher data $(x_i, y_i, \ldots, z_i, w_i)$ (i=0, 1, 2, ..., k) corresponding to said subject subspace.

$$\begin{pmatrix} x_1 & y_1 & \cdots & z_1 & 1 \\ x_2 & y_2 & \cdots & z_2 & 1 \\ \vdots & \vdots & & \vdots & \vdots \\ x_k & y_k & \cdots & z_k & 1 \end{pmatrix} \begin{pmatrix} a_k^j \\ b_k^j \\ \vdots \\ c_k^j \\ d_k^j \end{pmatrix} = \begin{pmatrix} w_1 \\ w_2 \\ \vdots \\ w_k \end{pmatrix} \quad (101)$$

7. The apparatus of claim 6, wherein said learning control means finds said $a_k, b_k, \ldots, c_k, d_k$ as least squares solutions of said simultaneous equation if said simultaneous equation has no solutions.

8. The apparatus of claim 6, wherein said learning control means is for finding said plane coefficients $a_k, b_k, \ldots, c_k, d_k$ that minimize least squares solutions of a flat plane equation (102) given below if a matrix given by said simultaneous solution equation has a rank less than (n+1), if said subject subspace lies within ranges given by $x_L \leq x \leq x_U$, $y_L \leq y \leq y_U, \ldots$, and if the plane coefficients of the equation for a flat plane corresponding to the subject subspace are $a_{k-1}, b_{k-1}, \ldots, c_{k-1}, d_{k-1}$.

$$\int_{z_L}^{z_U} \ldots \int_{y_L}^{y_U} \int_{x_L}^{x_U} \{(a_k - a_{k-1})x + (b_k - b_{k-1})y + \ldots + (c_k - c_{k-1})z + (d_k - d_{k-1})\}^2 dx dy \ldots dz \quad (102)$$

9. The controlled variable-calculating apparatus of claim 6, wherein said learning control means is for calculating said plane coefficients by singular value decomposition techniques.

10. The controlled variable-calculating apparatus of claim 2, wherein said learning control means is for updating said equations for flat planes such that said flat planes pass through newest data items of said teacher data corresponding to said subject subspace.

11. The apparatus of claim 1, further comprising a recording medium for storing a program for operating a computer system acting as the controlled variable-calculating means and as the learning control means of a controlled variable-calculating apparatus.

12. The apparatus of claim 5, wherein
said learning control means updates said equations for said flat planes by updating said plane coefficients a, b, . . . , c, d with using a method of finding solutions of a following simultaneous equation (106), comprising:

$$\begin{pmatrix} x_1 & y_1 & \cdots & z_1 & 1 \\ x_2 & y_2 & \cdots & z_2 & 1 \\ \vdots & \vdots & & \vdots & \vdots \\ x_k & y_k & \cdots & z_k & 1 \end{pmatrix} \begin{pmatrix} a_k \\ b_k \\ \vdots \\ c_k \\ d_k \end{pmatrix} = \begin{pmatrix} w_1 \\ w_2 \\ \vdots \\ w_k \end{pmatrix} \quad (106)$$

reforming said equation (106) given below into a simultaneous equation (107) given below when all of vector elements of a (n+1)-th line is 1;

$$\begin{pmatrix} x_1 - \bar{x} & y_1 - \bar{y} & \cdots & z_1 - \bar{z} \\ x_2 - \bar{x} & y_2 - \bar{y} & \cdots & z_2 - \bar{z} \\ \vdots & \vdots & & \vdots \\ x_k - \bar{x} & y_k - \bar{y} & \cdots & z_k - \bar{z} \end{pmatrix} \begin{pmatrix} a_k \\ b_k \\ \vdots \\ c_k \end{pmatrix} = \begin{pmatrix} w_1 - \bar{w} \\ w_2 - \bar{w} \\ \vdots \\ w_k - \bar{w} \end{pmatrix} \quad (107)$$

where, average values $\bar{x}, \bar{y}, \ldots, \bar{z}$ of vector elements of a first to n-th lines of the left term and average value $\bar{w}$ of the right term are respectively given by $$\bar{x} = \frac{1}{k}\sum_{i=1}^{k} x_i, \quad \bar{y} = \frac{1}{k}\sum_{i=1}^{k} y_i, \quad \bar{z} = \frac{1}{k}\sum_{i=1}^{k} z_i, \quad \bar{w} = \frac{1}{k}\sum_{i=1}^{k} w_i$$

providing $N_p, N_q, \ldots, N_r$ typical values for n variables $a_k, b_k, \ldots, c_k$ constituting the equation (107), said typical values of said $a_k$ constituting of $\hat{a}_1, \hat{a}_2, \ldots, \hat{a}_{Np}$, said typical values of said $b_k$ constituting of $\hat{b}_1, \hat{b}_2, \ldots, \hat{b}_{Nq}$, and said typical values of said $c_k$ constituting of $\hat{c}_1, \hat{c}_2, \ldots, \hat{c}_{Nr}$;

searching a combination of said typical values that minimizes the following equation (109) in at least one combinations in $(N_p \times N_q \times, \ldots, \times N_r)$ combinations; and $$F(\hat{a}_p, \hat{b}_q, \ldots, \hat{c}_r) = \sum_{i=1}^{k} (\hat{a}_p(x_i - \bar{x}) + \hat{b}_q(y_i - \bar{y}) + \cdots + \hat{c}_r(z_i - \bar{z}) - (w_i - \bar{w}))^2 \quad (109)$$

calculating a (n+1)-th variable of equation (106) by replacing solutions $a_k, b_k, \ldots, c_k$ into an equation (108) given below.

$$d_k = \bar{w} - (a_k \bar{x} + b_k \bar{y} + \ldots + c_k \bar{z}) \quad (108)$$

13. The apparatus of claim 12, wherein
said learning control means respectively provides said typical values to each of said plane coefficients of said equations for flat planes.

14. The apparatus of claim 12, wherein
said learning control means respectively sets maximum values $a^U, b^U, \ldots, c^U$ and minimum values $a^L, b^L, \ldots, c^L$ for each derivative $$\frac{\partial f}{\partial x}, \frac{\partial f}{\partial y}, \ldots, \frac{\partial f}{\partial z}$$

of a controlled output signal f with respect to each of said input variables x, y, . . . , z; and said learning control means selects said typical values with respect to said plane coefficients a, b, . . . , c for said input variables x, y, . . . , z so that said typical values of said $a_k$ satisfy $a^L \leq \hat{a}_1 < \hat{a}_2 < \ldots < \hat{a}_{Np} \leq a^U$, said typical values of said $b_k$ satisfy $b^L \leq \hat{b}_1 < \hat{b}_2 < \ldots < \hat{b}_{Nq} \leq b^U$, and said typical values of said $c_k$ satisfy $c^L \leq \hat{c}_1 < \hat{c}_2 < \ldots < \hat{c}_{Nr} \leq c^U$.

15. The apparatus of claim 14, wherein
said typical values are determined so that said controlled variable w is within a predetermined range, even when at least one of said typical value $\hat{a}_i, \hat{b}_i, \ldots, \hat{c}_i$ is changed to one of corresponding typical values $\hat{a}_{i+1}, \hat{b}_{i+1}, \ldots, \hat{c}_{i+1}$.

16. The apparatus of claim 12, wherein
said flat plane updated by said learning control means is defined as $w = \hat{a}_p x + \hat{b}_q y + \hat{c}_r z + d^i$, and a flat plane adjacent to said updated flat plane is defined $w = \hat{a}_l x + \hat{b}_m y + \hat{c}_n z + d^j$;

providing said typical values of said $a_l$ constituting of $\hat{a}_{l^L}, \ldots, \hat{a}_{l^U}$, said typical values of said $b_m$ constituting of $\hat{b}_{l^L}, \ldots, \hat{b}_{l^U}$, and said typical values of said $c_n$ constituting of $\hat{c}_{l^L}, \ldots, \hat{c}_{l^U}$, where $1 \leq l^L \leq p' \leq l^U \leq N_p$, $1 \leq m^L \leq q' \leq m^U \leq N_q$, $1 \leq n^L \leq r' \leq n^U \leq N_r$;

searching a combination of said typical values that minimizes the following equation (110) in $((l^U - l^L + 1) \times (m^U - m^L + 1) \times \ldots \times (n^U - n^L + 1))$ combinations; and $$F(\hat{a}_l, \hat{b}_m, \ldots, \hat{c}_n) = \sum_{i=1}^{k} (\hat{a}_l(x_i - \bar{x}) + \hat{b}_m(y_i - \bar{y}) + \ldots + \hat{c}_n(z_i - \bar{z}) - (w_i - \bar{w}))^2 \quad (110)$$

calculating a (n+1)-th variable by replacing solutions $a_l, b_m, \ldots, c_n$ into an equation (111) given below, $$d_k = \bar{w} - (a_l \bar{x} + b_m \bar{y} + \ldots + c_n \bar{z}) \quad (111)$$

where, average values $\bar{x}, \bar{y}, \ldots, \bar{z}$ of vector elements of a first to n-th lines of the left term and average value $\bar{w}$ of the right term of an equation (112) are respectively given by $$\bar{x} = \frac{1}{k}\sum_{i=1}^{k} x_i, \bar{y} = \frac{1}{k}\sum_{i=1}^{k} y_i, \bar{z} = \frac{1}{k}\sum_{i=1}^{k} z_i, \bar{w} = \frac{1}{k}\sum_{i=1}^{k} w_i \quad (112)$$

$$\begin{pmatrix} x_1 & y_1 & \cdots & z_1 & 1 \\ x_2 & y_2 & \cdots & z_2 & 1 \\ \vdots & \vdots & & \vdots & \vdots \\ x_k & y_k & \cdots & z_k & 1 \end{pmatrix} \begin{pmatrix} a_l \\ b_m \\ \vdots \\ c_n \\ d^j \end{pmatrix} = \begin{pmatrix} w_1 \\ w_2 \\ \vdots \\ w_k \end{pmatrix}.$$

17. A control characteristic modification apparatus for modifying at least one part of a control characteristic, comprising:

controlled variable modification means permitting external modification of a controlled variable from externally inputted input variables; and updating means for updating the equations for flat planes such that said controlled variable corresponds to said input variables inputted after said controlled variable modification means modifies said controlled variable, when said controlled variable is entered via said controlled variable modification means.

18. The apparatus of claim 17, wherein said updating means maintains said modified controlled variable modified by said controlled variable modification means until said controlled variable modification means completes said modification, without automatically changing said controlled variable even if said input variables are changed before said controlled variable modification means completes said modification.

* * * * *